United States Patent
Ward et al.

(10) Patent No.: US 11,904,712 B2
(45) Date of Patent: Feb. 20, 2024

(54) FOREIGN OBJECT DETECTION FOR WIRELESS POWER TRANSFER SYSTEMS

(71) Applicant: InductEV Inc., King of Prussia, PA (US)

(72) Inventors: Matthew L. Ward, Exton, PA (US); Jorge E. Rivé, Phoenixville, PA (US)

(73) Assignee: InductEV Inc., King of Prussia, PA (US)

( * ) Notice: Subject to any disclaimer, the term of this patent is extended or adjusted under 35 U.S.C. 154(b) by 148 days.

(21) Appl. No.: 17/659,452

(22) Filed: Apr. 15, 2022

(65) Prior Publication Data
US 2023/0336034 A1     Oct. 19, 2023

(51) Int. Cl.
*B60L 53/124*     (2019.01)
*H02J 50/60*      (2016.01)
(Continued)

(52) U.S. Cl.
CPC ............ *B60L 53/124* (2019.02); *G01V 11/00* (2013.01); *G06T 7/74* (2017.01); *G06V 10/12* (2022.01); *G06V 10/24* (2022.01); *G06V 10/44* (2022.01); *G06V 10/74* (2022.01); *G06V 10/98* (2022.01); *G06V 20/52* (2022.01); *G08B 7/06* (2013.01);
(Continued)

(58) Field of Classification Search
CPC .............................. H02J 50/60; B60L 53/124; B60L 53/12–126; B60L 53/34; B60L 53/38–39; H01F 38/14
See application file for complete search history.

(56) References Cited

U.S. PATENT DOCUMENTS

| 510,758 A | 12/1893 | Adams |
| 645,576 A | 3/1900 | Tesla |

(Continued)

FOREIGN PATENT DOCUMENTS

| EP | 3050738 A1 * | 8/2016 | ............ B60L 53/12 |
| WO | WO-2015068476 A1 * | 5/2015 | ............ B60L 11/18 |

OTHER PUBLICATIONS

English machine translation of WO2015068476A1 published May 14, 2015. (Year: 2015).*

(Continued)

*Primary Examiner* — Rexford N Barnie
*Assistant Examiner* — David A Shiao
(74) *Attorney, Agent, or Firm* — Culhane Meadows PLLC; Michael P. Dunnam

(57) ABSTRACT

Foreign objects impinging on a ground transceiver assembly (GTA) of a wireless power transfer (WPT) station are detected using a two-stage foreign object detection system. In a first stage, at least one camera is positioned to observe a charging position of the GTA and an area surrounding the charging position. In a second stage, an impedance measurement circuit measures an impedance of a wireless power transfer coil of the GTA. An imaging processor analyzes images from the at least one camera to identify changes or features indicative of introduction of a foreign object onto an exposed surface of the GTA or in the area surrounding the charging position. A foreign object detection (FOD) controller triggers an impedance inspection of the GTA by the impedance measurement circuit and initiates a failsafe operation when movement of an object crossing into or over the charging position is detected.

41 Claims, 10 Drawing Sheets

(51) Int. Cl.

| | | |
|---|---|---|
| *G06V 20/52* | (2022.01) | |
| *G06V 10/74* | (2022.01) | |
| *G06V 10/24* | (2022.01) | |
| *G06V 10/44* | (2022.01) | |
| *G06V 10/98* | (2022.01) | |
| *G06T 7/73* | (2017.01) | |
| *G06V 10/12* | (2022.01) | |
| *G08B 7/06* | (2006.01) | |
| *G08B 21/02* | (2006.01) | |
| *G01V 11/00* | (2006.01) | |
| *H02J 50/10* | (2016.01) | |
| *G06V 40/10* | (2022.01) | |

(52) U.S. Cl.
CPC ............ *G08B 21/02* (2013.01); *H02J 50/10* (2016.02); *H02J 50/60* (2016.02); *G06T 2207/20216* (2013.01); *G06T 2207/20224* (2013.01); *G06T 2207/30232* (2013.01); *G06V 40/10* (2022.01); *G06V 2201/08* (2022.01)

(56) References Cited

U.S. PATENT DOCUMENTS

| | | | |
|---|---|---|---|
| 2,358,777 | A | 9/1944 | Rappleyea |
| 6,731,799 | B1 | 5/2004 | Sun et al. |
| 10,040,360 | B1 | 8/2018 | Long et al. |
| 10,814,729 | B2 | 10/2020 | Long et al. |
| 11,121,740 | B2 | 9/2021 | Daga et al. |
| 11,241,970 | B2 | 2/2022 | McMahon et al. |
| 11,278,173 | B2 | 3/2022 | Jones et al. |
| 2012/0119576 | A1* | 5/2012 | Kesler ............... H02J 50/70 307/9.1 |
| 2013/0241476 | A1* | 9/2013 | Okada ............... B60L 53/37 320/108 |
| 2014/0203629 | A1* | 7/2014 | Hoffman ............ B60L 53/37 307/104 |
| 2016/0218567 | A1* | 7/2016 | Nakano ............. B60L 53/12 |
| 2018/0152057 | A1* | 5/2018 | Misawa ............. B60L 53/124 |
| 2019/0074722 | A1 | 3/2019 | Shahsavari et al. |
| 2019/0181694 | A1 | 6/2019 | Roy et al. |
| 2019/0319493 | A1* | 10/2019 | Jiang ................. H02J 50/80 |
| 2020/0094697 | A1* | 3/2020 | Nagata .............. H02J 50/80 |
| 2020/0412178 | A1 | 12/2020 | Teggatz |
| 2021/0293855 | A1 | 9/2021 | Wolgemuth et al. |
| 2022/0073057 | A1* | 3/2022 | Sakai ................ H02J 50/10 |
| 2023/0030303 | A1* | 2/2023 | Ko ................... G06V 10/443 |

OTHER PUBLICATIONS

International Searching Authority; Notification of Transmittal of the International Search Report and Written Opinion of the International Searching Authority, or the Declaration from PCT Application No. PCT/US2023/012036 dated Apr. 27, 2023. Published PCT.

\* cited by examiner

FOREIGN OBJECT DETECTION FOR WIRELESS POWER TRANSFER SYSTEMS

TECHNICAL FIELD

The present disclosure relates generally to wireless power transfer, and more specifically to devices, systems, and methods related to wireless power transfer to remote systems such as vehicles including batteries. More particularly, the present disclosure relates to the detection and classification of foreign objects that could impinge on the future operation of the wireless power transfer equipment.

BACKGROUND

Wireless Power Transfer (WPT) technology is based on the scientific principle of electromagnetic induction as described by Lenz's law and Faraday's 1st law of induction. Early work in the development of WPT was done in the early 1890s by inventor Nikola Tesla as taught in U.S. Pat. No. 645,576, "System of transmission of electrical energy," issued Mar. 20, 1900.

The detection of potentially dangerous foreign debris introduced within the airgap of a WPT system has been accomplished using monitoring of electrical measurements during power transfer (i.e., efficiency decline, power loss, current reduction, changes in resistance, inductance, and capacitance) or using non-electrical measurements and additional sensors (weight, temperature, pressure). Foreign Object Detection (FOD) also has been done electro-optically (e.g., imaging with visual light, imaging with infrared light, RADAR) and sonically (ultra-sound imaging).

Digital cameras use solid-state sensors (e.g., CCD (charge-coupled device) or, CMOS (complementary metal-oxide semiconductor)) to capture light collected through a lens and to convert the captured light into electronic image data. The digital image contains a certain number of pixels, with each pixel being mapped onto a planar grid. Each pixel has its own tonal value that determines the image's hue or color. Image resolution is determined by the number of pixels-per-inch (ppi) of the sensor. The format of a digital image defines the bit depth, dynamic range, file size, file format, and compression (e.g., as in Recommendation ITU-R BT.2020-2). Video (a stream of images at a frame rate) imaging is also so defined (e.g., Digital Cinema System Specification (DCSS)).

Use of images for measurement, and the mathematical techniques involved, became common due to aerial photography and mapping as in U.S. Pat. No. 510,758. "A METHOD OF PHOTOGRAMMETRY," patented Dec. 12, 1893; and U.S. Pat. No. 2,358,777 "Method and means for oblique aerial photographic mapping", issued Sep. 26, 1944. More recently, objects within the images have been identified using image recognition techniques. Image recognition is the ability of a machine vision system or to identify objects, people, places, and actions in images. The machine vision system may use artificial intelligence and trained algorithms to recognize images through the camera system.

Impedance of a complex circuit can be measured directly. A direct measurement would include the measurement of the voltage (V) supplied to the circuit divided by the current (I) flow. A change in circuit impedance can be determined by multiple measurements of current response to a set voltage signal.

A first current response measurement, at a first AC voltage, would set the nominal impedance (V/I) and then subsequent measurements would be monitored for a change in the (V/I) ratio with any perturbation of the circuit detectable in both the magnitude and phase of the current response.

SUMMARY

Various examples are now described to introduce a selection of concepts in a simplified form that are further described below in the Detailed Description. The Summary is not intended to be used to limit the scope of the claimed subject matter.

Foreign objects impinging on a ground transceiver assembly (GTA) of a wireless power transfer (WPT) station are detected using a two-stage foreign object detection system. In a first stage, at least one camera is positioned to observe a charging position (i.e., a ground transceiver station (GTS)) with at least one GTA and an area surrounding the charging position. In a second stage, an impedance measurement circuit measures an impedance of a wireless power transfer coil of the GTA. An imaging processor analyzes images from the at least one camera to identify changes or features indicative of introduction of a foreign object onto an exposed surface of the GTA or in the area surrounding the charging position. A foreign object detection (FOD) controller triggers an impedance inspection of the GTA by the impedance measurement circuit and initiates a failsafe operation when movement of an object crossing into or over the charging position is detected.

In sample configurations, a method of detecting foreign objects impinging on a ground transceiver assembly (GTA) of a wireless power transfer (WPT) station includes observing an area surrounding a charging position of the GTA using at least one camera and analyzing images from the at least one camera to identify changes or features indicative of introduction of a foreign object onto an exposed surface of the GTA or in the area surrounding the GTA. An impedance inspection of the GTA is triggered when the images are indicative of presence of the foreign object on the exposed surface of the GTA or in the area surrounding the GTA. A failsafe operation is initiated when presence of the foreign object on the surface of the GTA is confirmed by the impedance inspection.

In the sample configurations, observing the area surrounding the charging position of the GTA using the at least one camera is initiated when a vehicle is approaching, present, or scheduled to be present at the charging position. Observing the area surrounding the charging position of the GTA using the at least one camera may include monitoring the area surrounding the charging position when the WPT station is not in use for people, animals, or vehicles that could interfere with charging by the WPT station, and when at least one of a person, an animal, or a vehicle is detected, triggering the impedance inspection to be conducted before the WPT station may be used. Also, observing the area surrounding the charging position of the GTA using the at least one camera may include monitoring the area surrounding the charging position when the WPT station is in use for people, animals, or vehicles that could interfere with charging by the WPT station, and when at least one of a person, an animal, or a vehicle is detected, initiating the failsafe operation to at least one of reduce or remove power from the WPT station, signal a driver or occupant of the vehicle, or set visual or audio alarms to alert the at least one person, animal, or vehicle.

In the sample configurations, analyzing images from the at least one camera may include receiving image data based on recent or edited images or representative models of at least one of the charging position or the area surrounding the charging position and comparing the recent or edited images or representative models to images captured while observing the charging position or the areas surrounding the charging position to identify image differences indicative of a foreign object. Analyzing images from the at least one camera also may include detecting at least one of edges or corners of the GTA and aligning images taken by the at least one camera to at least one of detected edges or corners of the GTA. Analyzing the images from the at least one camera may also include averaging pixels from a series of multiple subsequent images.

In other configurations, analyzing images from the at least one camera may include waiting until an image stream from the at least one camera is received, comparing a position, number and spacing of the GTA in an image in the image stream to a reference image, averaging multiple images in the image stream to filter out image errors, performing pixel subtraction to eliminate static sections of the averaged multiple images, comparing a resulting foreground image with a prior foreground image to determine a current position relative to the GTA, and at least one of providing an alert or suspending at least one of charging or impedance inspection when a foreign object is found to be within a preset safety threshold around the GTA, approaching the GTA, or projected to cross the GTA.

In yet other configurations, analyzing images from the at least one camera may include waiting until at least one full image corresponding to a full image of the GTA is received, centering the at least one full image using at least one of detected edges or corners of the full image of the GTA, averaging multiple images of the GTA to filter out image errors, performing pixel subtraction to compare the full image of the GTA with a prior image of the GTA showing the GTA without the foreign object, comparing a result of the pixel subtraction to a detection threshold, and when the result of the pixel subtraction exceeds the detection threshold, at least one providing an alert or suspending availability of the GTA until an impedance inspection may be completed.

In still other configurations, analyzing images from the at least one camera may include analyzing the images to recognize humans or animals approaching a vehicle during charging at the charging position and suspending the charging when a human or animal is detected in the area surrounding the charging position.

In the sample configurations, the impedance inspection of the GTA is triggered when an object is detected on the exposed surface of the GTA longer than a set duration of time. The impedance inspection of the GTA may include powering-up the WPT station at a level below a charging level to measure impedance of the GTA against past impedance readings or models and initiating a failsafe operation upon detection of an increased impedance indicative of a conductive object on or adjacent to the GTA. The impedance inspection of the GTA may further include sending a test alternating current to a coil assembly of the WPT station in the form of a sine wave, a square wave, or a pulse train at a test current level that powers the coil assembly of the WPT station at a fraction of 5-50% of a nominal wireless power applied to the coil assembly of the WPT station during charging, measuring a current passing through the coil assembly and a differential voltage across the coil assembly of the WPT station, and determining an impedance of the WPT station from the measured current and differential voltage.

In other configurations, the impedance inspection of the GTA may include taking at least one baseline impedance measurement of the GTA and storing impedance values for comparison to impedance values during impedance inspection triggered when movement of an object crossing into or over the charging position is detected. Impedance changes due to temperature variation or varying environmental conditions may also be tracked and the baseline impedance measurement of the GTA as function of temperature variation or varying environmental conditions stored in a lookup table may be adjusted based on at least one of a measured temperature or environmental conditions.

In yet other configurations, adjusting the baseline impedance measurement of the GTA may include monitoring impedance from one impedance measurement to the next and, when an impedance change below a first threshold is detected, updating the baseline impedance to a new baseline impedance. On the other hand, when the impedance change is greater than the first threshold but lower than a second threshold, the baseline impedance is not updated and an object detection event is not raised. Also, when the impedance change exceeds the second threshold, the baseline impedance is also not updated and the object detection event is raised.

In still other configurations, the impedance inspection of the GTA is triggered when the charging position is unoccupied and quiescent for charging. The impedance inspection of the GTA also may be triggered when the GTA is unoccupied and analysis of the images from the at least one camera show at least one of a change indicative of presence of a persistent object on the GTA, an object crossing a threshold a predetermined distance from the GTA, or a pedestrian or non-charging vehicle crossing over the GTA. The impedance inspection of the GTA may further be triggered when the GTA is occupied by a vehicle for charging and analysis of the images from the at least one camera show a person, an animal, or an object breaching a preset safety threshold around the GTA. Also, the impedance inspection of the GTA may be triggered upon detection of an approaching electric vehicle for charging by the WPT station at the charging position or upon detection of an electric vehicle departing from the charging position.

In the sample configurations, initiating the failsafe operation may include taking the GTA out of service while the charging position is unoccupied by a vehicle for charging. On the other hand, when the charging position is occupied by a vehicle for charging, the failsafe operation may be initiated when movement of the foreign object crossing into or over the charging position is detected. An alert may be issued or the failsafe operation initiated when an object is detected to be moving toward the charging position during the impedance inspection or during charging of the vehicle.

In other configurations, the failsafe operation may be initiated when the impedance inspection of the GTA produces a variation of a measured impedance from a measured baseline impedance that exceeds a detection threshold range in at least one of magnitude or phase.

In the sample configurations, a first camera is deployed for close-in observation of the charging position and a second camera is deployed for wide-area observation of the area surrounding the charging position. Also, a series of cameras may be deployed where each camera has coverage over one or more GTAs from elevated positions. Multiple boundaries may be set for each camera to present a layered prioritization of camera outputs for processing and alerts.

In the sample configurations, when a foreign object is detected on the exposed surface of the GTA or in the area surrounding the charging position, a robotic cleaning device or mobile personnel may be dispatched to remove the detected foreign object from the exposed surface of GTA.

In addition to the method of detecting foreign objects, a system for detecting foreign objects impinging on a ground transceiver assembly (GTA) of a wireless power transfer (WPT) station is described. The system includes at least one camera positioned to observe an area surrounding a charging position of the GTA, an impedance measurement circuit that measures an impedance of a wireless power transfer coil of the GTA, an imaging processor that analyzes images from the at least one camera to identify changes or features indicative of introduction of a foreign object onto an exposed surface of the GTA or in the area surrounding the GTA, and a foreign object detection (FOD) controller. The FOD controller triggers an impedance inspection of the GTA by the impedance measurement circuit when the images are indicative of presence of the foreign object on the exposed surface of the GTA or in the area surrounding the GTA and initiates a failsafe operation when presence of the foreign object on the surface of the GTA is confirmed by the impedance inspection.

In sample configurations, the at least one camera includes a first camera positioned for close-in observation of the charging position and a second camera positioned for wide-area observation of the area surrounding the charging position. The at least one camera may include a series of cameras each with coverage over one or more GTAs from elevated positions. Multiple boundaries may be set for each camera to present a layered prioritization of camera outputs for processing and alerts. Detection of a foreign object by the first camera or detection of a human or animal in the area surrounding the charging position by the second camera may trigger an impedance measurement by the impedance measuring circuit.

In the sample configurations, the FOD controller may enable and set detection thresholds and perimeters around the GTA, schedule image processing by the image processor, and send alerts and alarms to local and remote networked entities for controlling operation of the WPT station. The networked entities may include a station controller that manages charging schedules, power distribution, and at least one of wired or wireless communications associated with the WPT station. The system may also include a reservation system. The station controller may perform at least one of disabling the GTA in response to an alert from the FOD controller, reset local directional signals to the GTA, inform the reservation system that the GTA is off-line when a foreign object detection on the GTA is confirmed, and call for local maintenance or remote maintenance of the GTA.

In the sample configurations, the FOD controller may further include a processor that is programed to collect local data and remote data, settings, and software and to use collected data to verify communications links and apply security settings to the WPT station. The FOD controller may further query the at least one camera, the imaging processor, and each GTA of the WPT station to collect data captured while observing the area surrounding the charging position.

In other sample configurations, the system further includes a robotic cleaning device that is dispatched when a foreign object is detected on the exposed surface of the GTA or in the area surrounding the charging position to remove the detected foreign object from the exposed surface of GTA. The robotic cleaning device may be guided to the GTA wirelessly or using guideline cabling. The robotic cleaning device may include at least one of a fiber broom, a rotating broom, an electromagnet, an anti-Hall effect eddy current generator, a vacuum, or a suction device adapted to remove the foreign object. The robotic cleaning device may further include an electric vehicle that is charged by the WPT station. The robotic cleaning device also may use at least one of a secure wireless local area data network or an inductive communications network to communicate with the WPT station.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the embodiments described in the Detailed Description below.

BRIEF DESCRIPTION OF THE DRAWINGS

The foregoing and other beneficial features and advantages of the invention will become apparent from the following detailed description in connection with the attached figures, of which.

DETAILED DESCRIPTION

Figure 1:
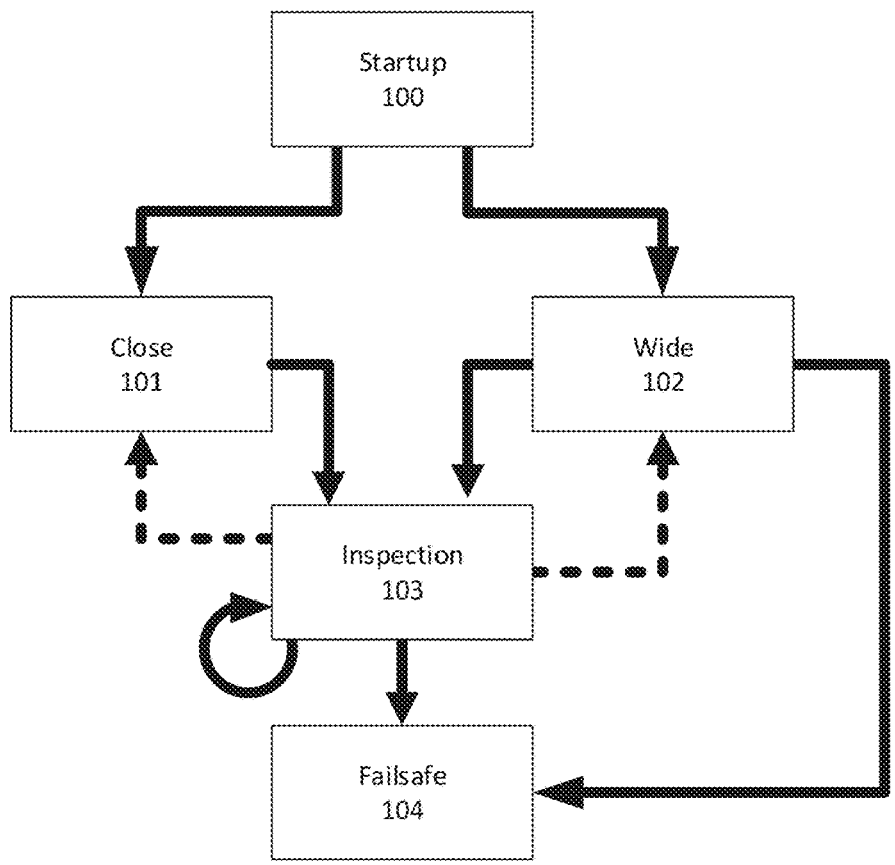
FIG. 1 is a flow diagram that graphically depicts the process for identification and classification of foreign objects impinging on the Ground Transceiver Assemblies (GTAs) of an unoccupied wireless power transfer (WPT) station in a sample configuration.

A detailed description of illustrative embodiments will now be described with reference to FIGS. 1-16. Although this description provides a detailed description of possible implementations, it should be noted that these details are intended to be exemplary and in no way delimit the scope of the inventive subject matter.

The term "battery" is used herein to depict a generic chemical energy storage system and could be replaced, supplemented, or hybridized with other portable energy storage systems (e.g., solid-state batteries, reversable fuel cells, ultra-capacitors). Also, while many of the examples used are of a wireless power transfer (WPT) system used to power the onboard systems and charge the batteries of a stationary electric vehicle (EV), this use is by no means the only use contemplated.

The term "electric vehicle (EV)" as used herein includes all battery-operated electric vehicles (BEV) as well as all hybrid EVs (HEV) and Dual charging BEVs (DBEV) with both plug-in and wireless charging capabilities.

In a Wireless Power Transfer (WPT) system, an ad-hoc open-core transformer is assembled to allow magnetic induction to transmit energy between paired (primary and secondary) coils for the duration of the charging session. In a modular WPT system, multiple individual primary coils are paired with geometrically corresponding secondary coils for greater energy transfer. Since the paired primary and secondary coils can support a reversed energy transfer, the terms Ground Transceiver Assembly (GTA) and Vehicle Transceiver Assembly (VTA) are used. In a standard EV charging scenario (electrical grid-to-vehicle), the GTA acts as the primary assembly while the VTA acts as the secondary assembly.

By manufacturing a standard GTA and a standard VTA, economies of scale can be achieved as the GTAs are combined into larger Ground-Transceiver-Stations (GTSs) to serve the Vehicle-Transceiver-Stations (VTSs) consisting of VTAs configured and mounted on electric vehicles. The GTSs are scalable to the power needs of the VTS-equipped EV.

The term optical sensor is used herein to refer to a digital electro-optical video camera. Electro-optical devices used for digital video photography commonly include CCD (charge-coupled device) or CMOS (complementary metal-oxide semiconductor) image sensors to capture the image. The semiconductor-based sensors capture light via the photoelectric effect and convert the light into electrons which are collected into electronic signals. The acquired image is then digitized for storage, transmission, and analysis. In the FOD application described herein, color images are assumed, although black and white images may also be obtained. Color images can be reduced to grayscale with minimal loss of information for applications such as edge detection and corner detection.

The impedance detection system used herein is based on measuring techniques used in eddy current Non-destructive Testing (NDT). NDT relies on the concept described in Faraday's Law of Induction in which a time varying (alternating) magnetic field induces eddy currents on a coupled conductive object. Using a source coil with multiple windings as the magnetic field source increases (proportionally to the number of windings) the induced eddy currents generated in the coupled conductive object(s). The induced eddy currents generate an opposing electromagnetic field which counteracts the magnetic field that induced them. The magnitude of these induced currents is proportional to the object's magnetic permeability and conductivity, and their effect manifests as a change in the nominal impedance of the source coil allowing detection of the presence of a coupled conductive object or objects. Impedance inspection testing may be performed at a single frequency or multiple frequencies to potentially identify and/or classify an object.

FIG. 1

FIG. 1 is a flow diagram that graphically depicts the process for identification and classification of foreign objects (ICFO) impinging on the Ground Transceiver Assemblies (GTAs) of an unoccupied wireless power transfer (WPT) station in a sample configuration. Both Inductively Coupled Power Transfer (ICPT) and the Capacitively Coupled Power Transfer (CCPT) techniques are supported in the ICFO technique described herein.

As illustrated in FIG. 1, the ICFO system starts at step 100 with data uploads and camera calibration. With 1-n cameras deployed to overlook and monitor the charging position, the automatic calibration is designed to save on manual calibration after a camera is installed and for physical parameter (height above ground, angle of depression) verification after restart. Image data, based on recent or edited images (or representative models) of the charging position and surrounding area, are uploaded for use in the later stages.

One or more digital video camera(s) are deployed to focus on the physical charging position (the visible physical footprint for the coils of an ICPT system or the plate(s) in a CCPT system). If a single camera is deployed, use of optical zooming and potentially movement (by using a panning or panning-and-angling motorized mounting) is necessary for providing both the close-up observation of the charging position as well as the area surrounding the charging position.

Startup step 100 can occur at any time (for instance at system boot, or after a triggering event has been cleared) but can only move to Close Area observation at step 101 while the charging position is not in use. Once started, the ICFO system may elect to start observation at either or both of the charging position and the area surrounding the charging position. While Wide Area observation at step 102 is preferably continuous, it may be initiated when a vehicle is approaching, present, or scheduled to be present at the charging position. Close Area observation at step 101 cannot be initiated when a vehicle is present (and the GTA(s) obscured by the EV chassis) but can be continuous or periodic once initiated.

In Close Area observation at step 101, the video camera(s) observe the charging position, focused on the upper surface of the GTA coil assembly. The charging position may be modular in nature with a single or several GTAs. Images from the camera are analyzed for changes or features indicative of the introduction of a foreign object onto the exposed surface of a GTA or in the immediate proximity. The presence of persistent objects (versus transitory like a wind-blown leaf or litter) resting on any GTA longer than a set duration of time will trigger a secondary Inspection at step 103.

In Wide Area observation at step 102, video observation, using one-or-more cameras, monitors the area around the charging position for people, animals, or moving objects. Any approach to the unoccupied charging position over a set perimeter may trigger secondary Inspection at step 103. Movement crossing into or over the charging position also will trigger secondary Inspection at step 103.

Wide Area observation at step 102 will also function during a charging session when the charging position is occupied by a vehicle and the view of the GTA(s) is occluded from the camera(s) view. In this operation, the detection of a nearby or approaching object can engage the Failsafe stage at step 104.

Inspection at step 103 is initiated only with an unoccupied, quiescent charging position. Using a low energy setting, the GTA(s) for which a trigger has been issued are powered-up and the impedance of the power system (inductive coils or capacitive plates) checked against past impedance readings or models. The temperature of the GTA coil assembly can be reported to increase detection sensitivity.

Inspection at step 103 also may be activated periodically with the Wide Area observation at step 102 providing assurance that no people, vehicles, or animals are in a pre-defined safety perimeter. The wide area observation at step 102 can also alert when objects are moving toward or passing through the safety perimeter.

During Inspection at step 103, the impedance detector may confirm or deny the presence of a dangerous (i.e., conductive) object within the charging position and on or adjacent the surface the GTA(s). If not confirmed, operations will revert to the prior stage (Close Area observation at step 101 or Wide Area observation at step 102). If confirmed, the Inspection at step 103 will trigger the Failsafe step 104.

Failsafe step 104 includes both the automatic off-lining of the charging position (upon confirmed detection of a conductive object on or next to the resident GTA(s)) and reporting mechanisms to alert maintenance of the need to clear the charging position of object(s) before restarting charging operations.

FIG. 2

Figure 2:
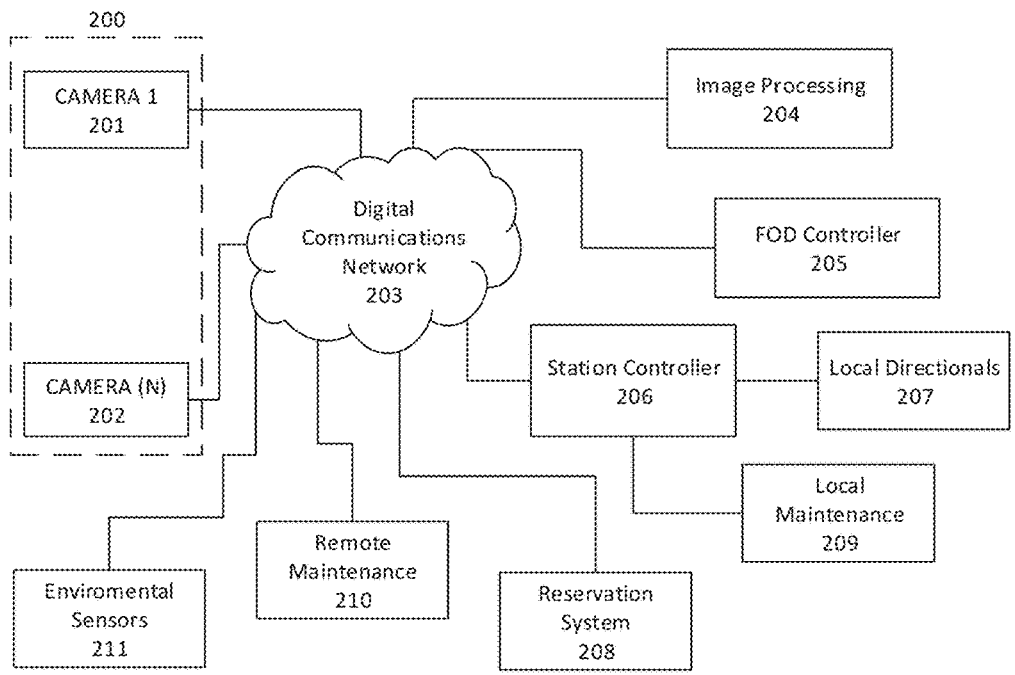
FIG. 2 is a system diagram that depicts the high level functional components and interconnections of a multi-level Foreign Object Detection (FOD) system in a sample configuration.

FIG. 2 is a system diagram that depicts the high level functional components and interconnections of a multi-level Foreign Object Detection (FOD) system in a sample configuration. In this configuration, a camera system 200 includes a first video camera 201 used for close-in observation and a second video camera 202 used for wide-area observation. The video cameras of the camera system 200 are mounted so as to provide low-oblique views. A Digital Communications Network 203 (DCN) (e.g., a network using TCP/IP for simplex and duplex communications) provides interconnection amongst system elements. The DCN 203 may support end-to-end tunneling encryption for security.

Image processing system 204 in this example is handled at a distinct computing platform but the necessary digital memory, programs, and processors could be bundled into other system elements such as the camera system 200 or the foreign object detection (FOD) controller 205. The FOD controller 205, Station Controller 206 and the Reservation System 208 may be implemented as programming running on a generic processing platform(s) running a near-real-time operating system on a generic computer processor with digital memory.

The FOD controller 205 programming enables and sets detection thresholds, perimeters, and scheduling (e.g., when the cutover to artificial illumination takes place) for the image processing and is the OAMPT (Operations, Administration, Maintenance, Provisioning, and Troubleshooting) node where uploads, upgrades, and communication security keys are entered. The FOD controller 205 is also responsible for sending alerts and alarms to local and remote networked entities such as the Station Controller 206, the Reservation System 208, and Remote Maintenance system 210.

The Station Controller 206 manages local charging schedules and power distribution. The Station Controller 206 also may interface to the remote Reservation System 208. The Station Controller 206 is the hub for wired and wireless communications (not shown) associated with the charging station. The Station Controller 206 can disable a charger in response to a FOD alert, reset local directional signals 207 (e.g., lights, signage, and radio broadcasts), inform the Reservation System 208 that the specific charging station is off-line, and call for local maintenance 209 (if available) or remote maintenance 210. Remote Maintenance 210 is expected to work on a dispatch office basis and is called only when personnel are needed to repair or clean the charging station(s) incurring significant downtime for the charging station.

The Reservation System 208 is an optional remote entity. The FOD Controller 205 can send an out-of-service alarm to the Station Controller 206 when a confirmed foreign object detection occurs for a specific charging station, allowing remote management of charging scheduling and rescheduling via an interface of the Station Controller 206 to the Reservation System 208.

In sample configurations, environmental sensors 211 are also provided that may include sensors for a time-of-day clock, sun angle detection, ambient light level measurement, air temperature, rain detection, snow detection, and individual GTA internal temperatures (e.g., the GTA coil assembly temperature). The environmental sensors 211 may measure temperature variations or varying environmental conditions that may cause changes in the impedance of the GTA. The measured values may be used to adjust the baseline impedance measurement of the GTA to reflect the impedance changes.

FIG. 3

Figure 3:
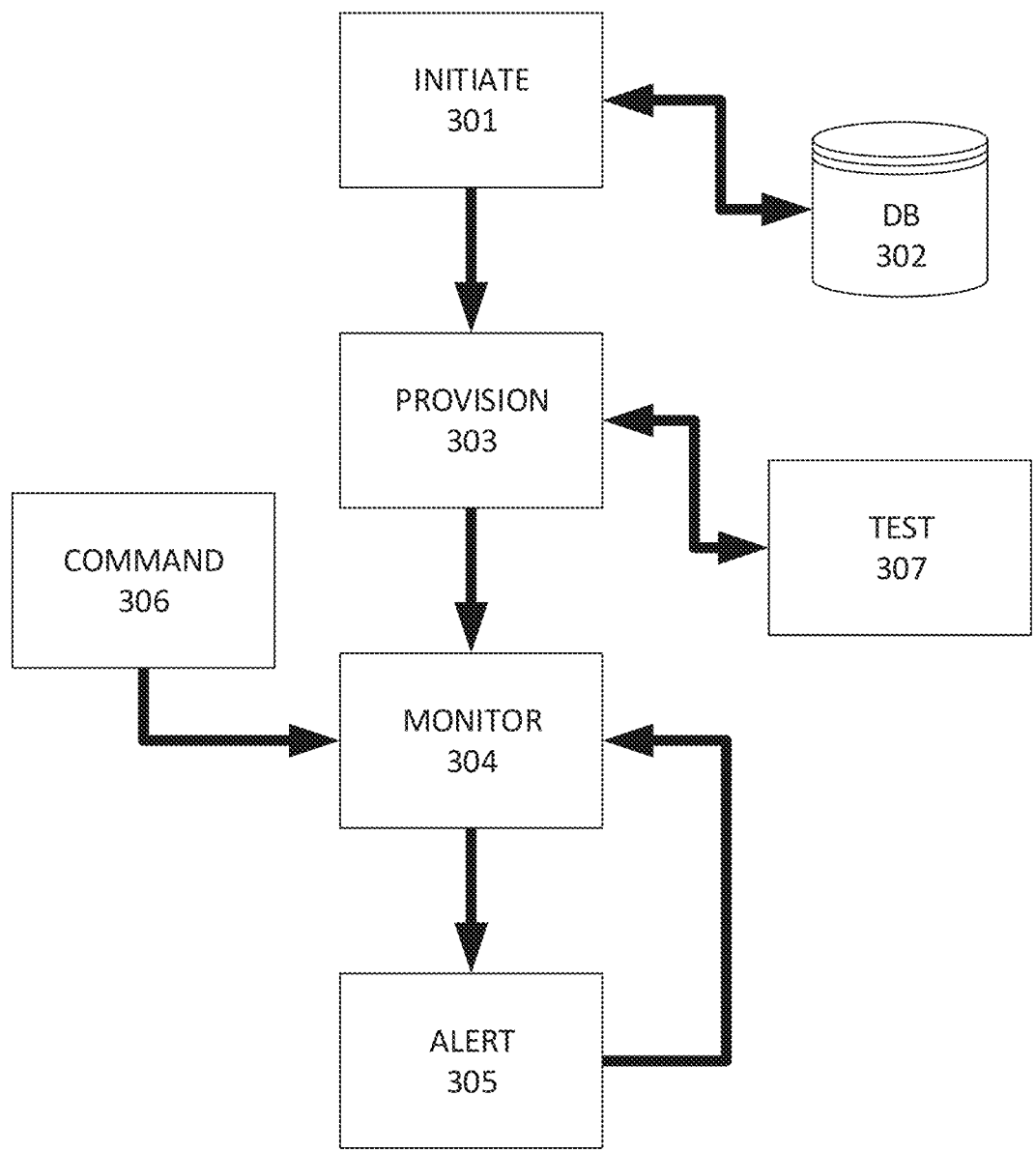
FIG. 3 is a flow diagram that depicts the operational flow of the FOD controller of FIG. 2 in a sample configuration.

FIG. 3 is a flow diagram that depicts the operational flow of the FOD controller of FIG. 2 in a sample configuration. The FOD Controller 205 is the OAMPT (Operations, Administration, Maintenance, Provisioning, and Troubleshooting) center for the FOD system of FIG. 2.

During the Initiate step 301, the FOD Controller 205 collects local data and remote data, settings, and software stored in database 302. During the Initiate step 301, using the uploaded data, communications links are verified and security settings (e.g., encryption, access controls) are applied.

In the Provision step 303, the secured communications links are used to query devices under control of the FOD controller 205 which include the camera(s) 200 and the image processing data processor(s) 204 (if separate from the FOD controller 205), and each GTA (not shown) for each GTS under management. Once provisioned, the FOD system operates, keeping each GTA and the area surrounding each GTS under observation during the Monitoring step 304. During the Monitoring step 304, a foreign object detection by the close-in observation camera 201 may occur and a subsequent examination (using impedance measurement) also may occur. Also, during the Monitoring step 304, the wide-area observation camera 202 may detect an ingress event. During the Monitoring step 304, a periodic or triggered inspection (using impedance testing) may flag a foreign object detection.

If a FOD event occurs, then the FOD controller 205 moves to the Alert step 305 (while continuing Monitoring at step 304) and sends an alert message to the Station Controller 206. The Alert step 305 will be maintained until cleared for the affected equipment (GTS(s), GTA(s)).

The Station Controller 206 also may command the FOD Controller 205 at step 306 to perform specific tasks during the monitoring step 304. These tasks can include raising or lowering a detection threshold or triggering an inspection of a GTS prior to or after a charging session.

The FOD controller 205 also may be used to test at step 307 the FOD system during the Monitoring step 304. Testing, via impedance measurement, is especially useful when collecting baseline data to be included in the detection model due to installation, additions, or reconfigurations of the wireless charging system GTS(s) or when environmental conditions, as measured by the environmental sensors 211, require a re-baselining of optical detection thresholds (e.g., due to seasonality, artificial illumination, or repaving).

FIG. 4

Figure 4:
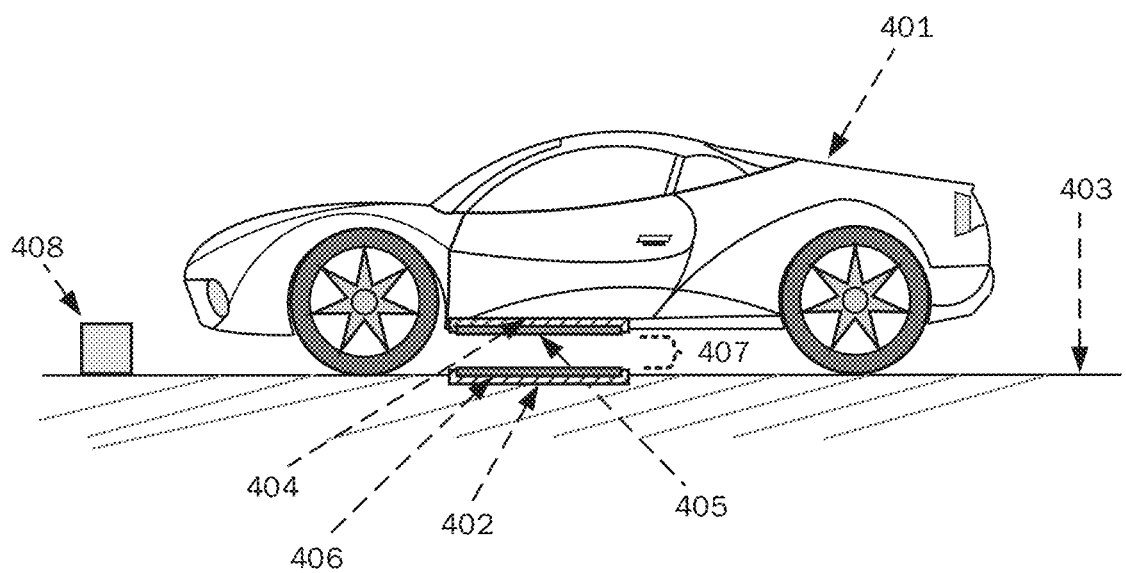
FIG. 4 is a diagram illustrating an electric vehicle charging station using WPT in a sample configuration.

FIG. 4 is a diagram illustrating an electric vehicle charging station using WPT in a sample configuration. In FIG. 4, the WPT system is in the act of charging. As shown, the EV 401 is at rest over the ground charger 402. The ground charger (Ground Transceiver Station (GTS)) 402 is here shown as projecting above the pavement 403 although other GTS 402 installations are contemplated (e.g., flush-mounted with the pavement, embedded under the pavement). The vehicle transceiver station (VTS) 404 is affixed to the underside of the EV 401 in this example.

The GTS 402 includes one-or-more coil assemblies 406 with ancillary apparatus and structural members for mechanical support, cooling, eddy current shielding and inductive communications links (collectively a Ground Transceiver Assembly (GTA)). Similarly, the VTS 404 includes one-or-more Vehicle Transceiver Assemblies (VTAs), each with a coil assembly 405 and ancillary apparatus and structural members for mechanical support, cooling, eddy current shielding and inductive communications links. The GTA coil assembly 406 and the VTA vehicle coil assembly 405 are typically the same size in the X-Y plane but can be made with differing numbers of turns. The coil-to-coil gap 407 in the Z plane is a function of ground charger 402 type, EV 401 build, and loading of the EV 401. In addition to the coil-to-coil-gap 407, the GTA-to-VTA orientation may experience centering offsets as well as deviations from parallel coil matching from roll, pitch, and yaw. The positioning deviations may be unique for each charging session and are unknown prior to measurement. Each positioning deviation and coil-to-coil gap 407 affects the value of the coupling constant (k) resulting in an individualized resonant frequency for each GTA-to-VTA pair for each charging session. The curb 408 is one visual (and occasionally haptic) indicator of the GTS position for the driver, driver assistance system, or autonomous driving system.

Although in FIG. 4 both the GTS 402 and VTS 404 are shown as single coil assemblies (the GTS 402 has a single GTA and the VTS 404 has a single VTA in FIG. 4), multiple coil assembly pairs (wireless couplers) can be used for higher power transfer. The advantages of a modular approach to wireless power systems also come into play. By manufacturing of a single GTA and a single standard VTA, economies of scale can be achieved as the GTAs are combined into larger Ground-Transceiver-Stations (GTSs) 402 to serve the EV mounted VTS 404 with its one-or-more VTAs.

The modular GTS 402 and VTS 404 allow for charging stations where the flexible, dynamically assignable, dynamically configurable GTS 402 configurations (e.g., 1 GTA per GTS 402, 2 side-by-side (2×1) GTAs per GTS 402, 2 in-line (1×2) GTAs per GTS 402, 3 in-line (1×3) GTAs per GTS 402, 4 GTAs (2×2) per GTS 402, 6 GTAs (2×3) per GTS 402, or any GTA configuration that supports the largest vehicle VTS 404 (with a corresponding set of VTAs to be served) may be constructed.

Also, the GTS 402 and VTS 404 can be part of a bi-directional WPT system where the primary and secondary coils are switchable and the EV 401 provides energy to the electrical grid (not shown). Since a GTS 402 and paired VTS 404 may be operated in bidirectional mode, the wireless energy transfer can be from the electrical grid (via the GTS 402) to the vehicle (via the VTS 404) or reversed with the power originating from the EV's energy storage (e.g., battery pack) transmitted by the VTS 404 to the GTS 402 for powering a DC or AC load (e.g., a house or jobsite).

FIG. 5A

Figure 5A:
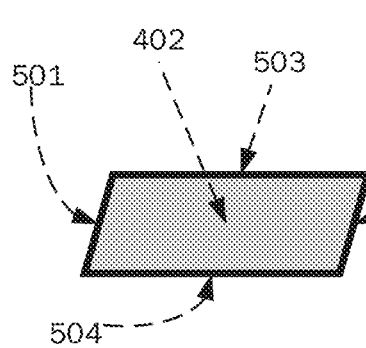
FIG. 5A is a diagram illustrating the visible arrangement of edges for a single GTA in a sample configuration.

FIG. 5A is a diagram illustrating the visible arrangement of edges for a single GTA in a sample configuration. In particular, FIG. 5A shows the edge detection used for alignment of close-in images taken over time. As the close-in camera(s) 201 may move over time (e.g., due to mounting slipping, mounting pole dimensional compression (cold shrinkage) or due to wind gusts) a method is needed to align and re-align the images taken at various times or with a stored model. Although visible light is used in the example FOD system, near infrared light may be used either as a substitute or for complementary image acquisition (for instance use at night under near-IR illumination, thus invisible to the human eye).

In FIG. 5A, the GTS 402, comprised of a single GTA in this example, is visible as a square shape mounted on or embedded in the pavement surface. The GTS 402 includes the leading edge 501, the trailing edge 502, the right edge 503 and the left edge 504.

To assist in edge detection, the pavement and the GTS 402 cover may be of differing colors. Edge detection algorithms (e.g., Canny edge detection, Sobel edge detection) are well suited to edge determination. A mathematical check of the lengths of the detected edges and parallelness can be used to verify successful edge detection prior to shifting of the captured image in imaging processing.

FIG. 5B

Figure 5B:
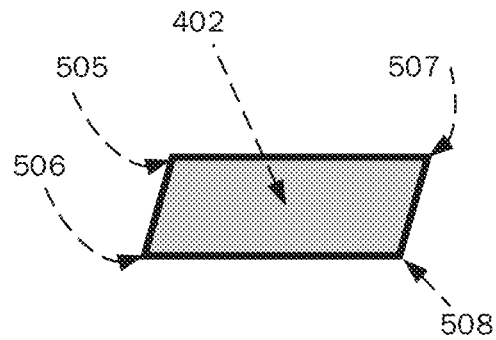
FIG. 5B is a diagram illustrating the visible arrangement of corners for a single GTA in a sample configuration.

FIG. 5B is a diagram illustrating the visible arrangement of corners for a single GTA in a sample configuration. In particular, FIG. 5B shows the corner detection used for alignment of close-in images taken over time. The GTS 402, comprised of a single GTA in this example, is visible as a square shape mounted on or embedded in the pavement surface. To assist in corner detection, the pavement and the GTS 402 cover may be of differing colors. Corner detection algorithms (e.g., Harris corner detector) are well suited to corner determination.

The GTS 402 in the FIG. 5B example installation has 4 corners that can be detected, the front-right corner 506, the front-left corner 507, the back-right corner 508, and the back-left corner 509.

A geometric check of the detected corner with the associated detected corners can be used to verify successful acquisition of an image of the GTS's component GTA or GTA(s). Combining edge and corner detection is possible at the cost of additional image processing time or capacity. A fallback approach is also possible where a failure to resolve an expected edge results in a corner detection would reduce the image processing load.

In addition to calibration of the close-in observation system camera(s) 201, the wide-area system can use the edge or corner detection to locate GTSs 402 in images taken of the area of observation during system setup, when new cameras are installed, or periodically to assure consistent image coverage.

FIG. 6

Figure 6:
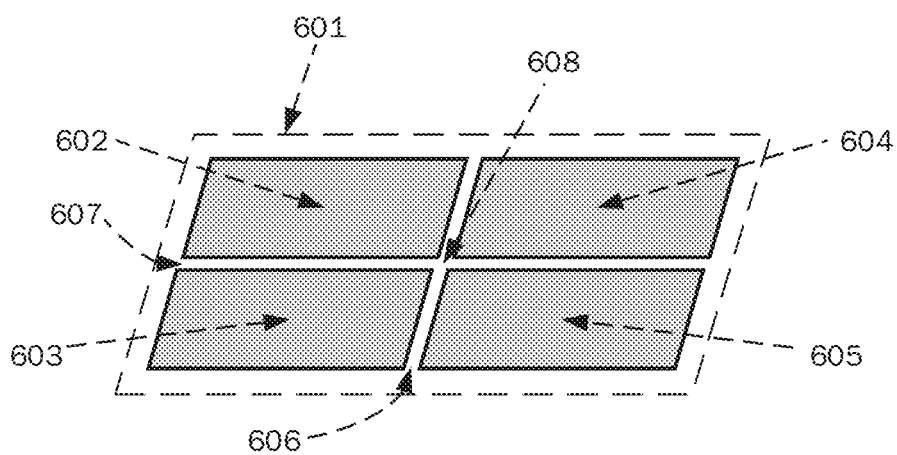
FIG. 6 is a diagram illustrating the observable arrangement of edges, corners, and interstices of a Ground Transceiver Station (GTS) constructed with multiple GTAs in a sample configuration.

FIG. 6 is a diagram illustrating the observable arrangement of edges, corners, and interstices of a Ground Transceiver Station (GTS) constructed with multiple GTAs in a sample configuration. In FIG. 6, the GTS 601 is a single flush-mounted GTS 601 with 4 modular GTAs 602, 603, 604, and 605, each presenting as a pavement-level, 500-millimeter, colored (e.g., with a uniform blue (nominally PANATONE 300C, "Momentum Blue" coated) square. The GTAs 602, 603, 604, and 605 are placed in a 2×2 square grid with a spacing 606 and 607 that is 2 centimeters apart and the entire GTS 601 is framed by a standard-contrast (light gray color) poured concrete perimeter. Due to use of local materials, the surrounding concrete and inter-GTS grouting may have added colorants to adjust the hue and thus the contrast.

As shown in FIG. 5A and FIG. 5B, a collection of edges and corners are available for detection for use in alignment of images of a GTA 602, 603, 604, and 605 (and single GTS 601). A GTS 601 with multiple modular GTAs 602, 603, 604, and 605 may present additional image features for image alignment. For example, in addition to the corners and edges of the GTAs 602, 603, 604, and 605, the GTS 601 also has an optical feature such as the meridian gap 606, the cross gap 607, and the center intersection 608 of the meridian gap 606 with the cross gap 607. Each of the gaps 606 and 607 present 2 parallel edges separated by a known distance of highly contrasting concrete or grout fill, while the center intersection 608, a high contrast area fill, is surrounded by 4 corners.

FIG. 7

Figure 7:
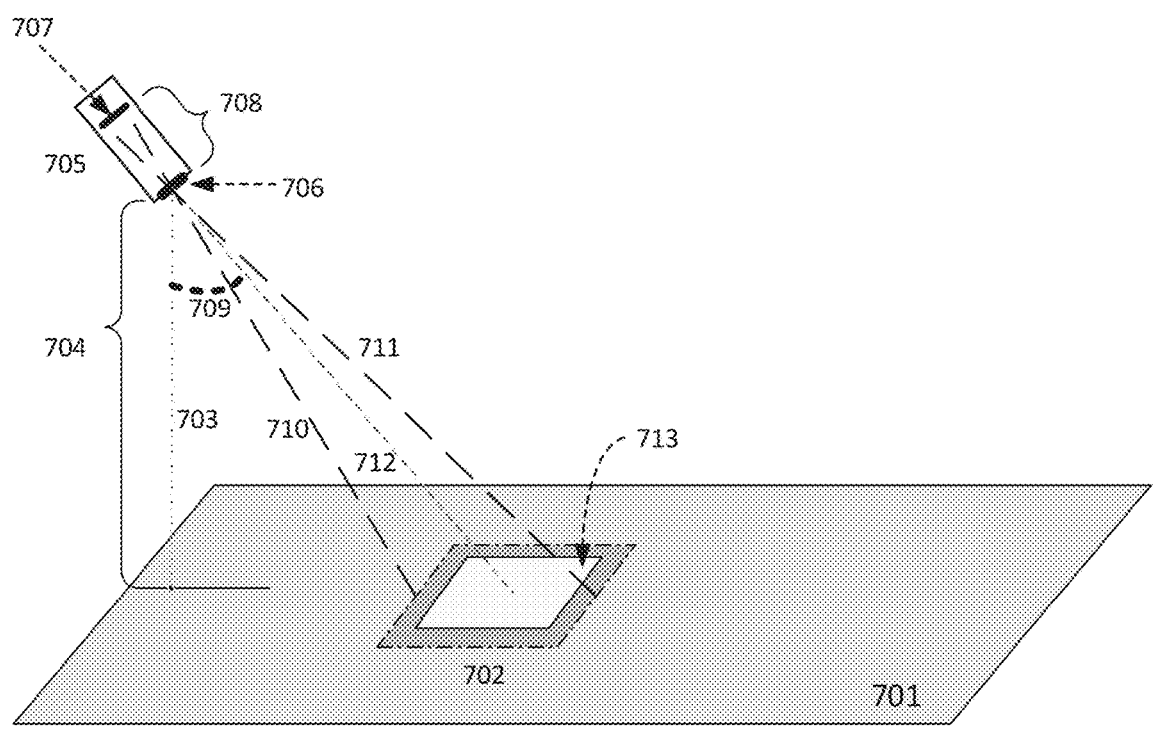
FIG. 7 is a diagram illustrating the use of a camera to observe a GTS from an elevation in a sample configuration.

FIG. 7 is a diagram illustrating the use of a camera to observe a GTS from an elevation in a sample configuration. In particular, FIG. 7 shows the close-in observation of the GTS 702 and immediate perimeter using a single camera.

In the configuration of FIG. 7, the pavement 701 contains a single GTS 702 surrounded by an invisible perimeter boundary 703. In some deployments, the perimeter boundary 703 will encompass both the GTS 702 and a contrasting color band of pavement 701 (e.g., colored concrete) providing a stand-off distance from the GTS 702 for enhanced detection of nearby foreign objects. At an elevation 704, the video camera 705 is affixed to a mast, light post, or other supporting structure to overlook the charging GTS 702 and adjacent area within the perimeter boundary 703. The camera 705 has a lens 706 and an image sensor 707. In this example, the focal length 708 between the lens 706 and image sensor 707 is set for maximum resolution of the single GTS 702 and adjacent area under observation.

The geometry of the camera's 705 field of view (FOV), which in this configuration only includes the charging GTS 702 and adjacent area within the perimeter boundary 703, is determined by the elevation (height above pavement level) 704, the angle of inclination 709, and the optical characteristics of the lens 706. The field-of-view is depicted here, for a single geometric axis, using the lower bound 710 and the upper bound 711. The center of the camera target is shown by the midline 712.

With the short ranges and angles used in the nominal close-in observation system, perspective distortion can be ignored as the distances between the leading edge and trailing edges are too short (<1 meter) to seriously degrade the resolution. The binary approach to foreign object detection (yes/no) for each GTA 713 also assists as any resolvable object on the GTA 702 is considered to be a foreign object and no identification is attempted by the close-in observation system.

FIG. 8

Figure 8:
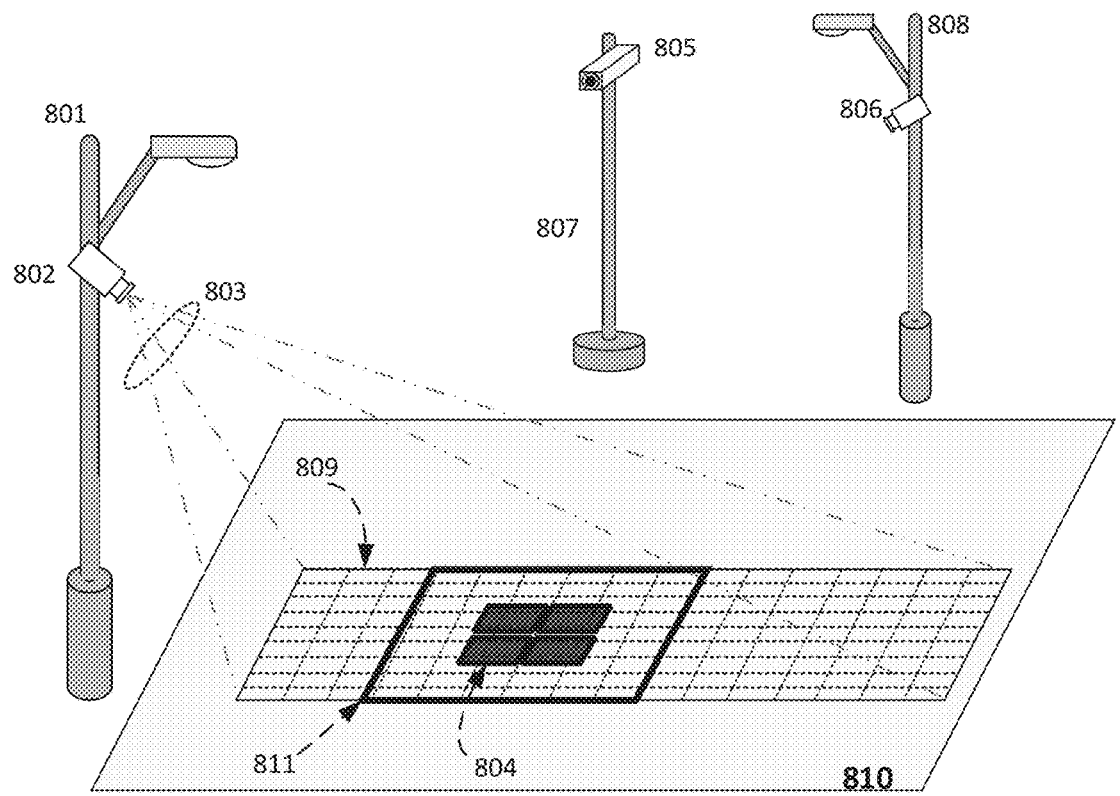
FIG. 8 is a diagram illustrating the use of one-or-more cameras to observe the area around a GTS from varied elevations in a sample configuration.

FIG. 8 is a diagram illustrating the use of one-or-more cameras to observe the area around a GTS from varied elevations in a sample configuration.

In FIG. 8, a Wide Area Observation System is shown that uses an exemplary light post 801 mounted, single overlooking camera 802 configuration, with the camera field of view 803 preset to monitor the pavement around a GTS 804. In this example, an 8K camera (with a 7680×4320 pixel sensor) is used, with the 16:9 pixel ratio used to segment the coverage area and volume into 144 square cells each with 230,400 pixels (480×480 pixels).

Wide Area Observation System detection relies on a camera (or set of cameras) overlooking the wider area of interest. This wider area of interest can include one or more GTSs (charging stations). The wide area observation system is, in-part, based on existing object detection technology (e.g., U.S. Pat. No. 6,731,799; "Object segmentation with background extraction and moving boundary technique") as available from commercial systems such as the IBM "Maximo" Visual Inspection system. The Wide Area Observation System monitors the wider area of interest for people, animals, or vehicles that could interfere with the charging station when in use and when not in use. This explicitly includes vandalism and sabotage.

When the GTS 804 (a wireless charging station) is not in use, the Wide Area Observation System monitors the wider area for intruding people, animals, or vehicles. If such an intruder approaches (within a set range) the inactive charging station or crosses over the charging station GTA(s), then an inspection 103 (FIG. 1) can be scheduled for before the charging station may be used. In this way, objects such as lost cargo, trash, formerly attached EV components or other items that may unintentionally or deliberately discarded can be detected prior to charging station use.

For the unoccupied, not-in-use charging station, the Wide Area Observation System and Close-in Observation system are complementary in that they may trigger operation of the other and both can trigger the secondary inspection system.

When the charging station is in use, that is an EV is in position to be charged, the Wide-area Observation system monitors the area around the GTS 804 for intruding entities (e.g., people, animals, vehicles). If such an intruder approaches (within a preset safety margin), attempts to enter the charging vehicle, or attempts to go under the charging vehicle, the Wide Area Observation System may signal the charging controller to reduce or remove power from the charger, signal the driver or occupants of the EV, and set visual or audio alarms to dissuade the encroaching entities.

In the FIG. 8 example, the Wide Area Observation System consists of a series of cameras 802, 805, and 806, each with coverage over one or more GTSs from elevated positions on light posts or masts 801, 807, and 808. The first camera 802 has a field of view 803 that observes an area 809 on the pavement 810. Within the observed area 809, an invisible boundary 811 has been set around the GTS 804. While only one boundary 811 has been set in this example, multiple boundaries can be created to present a layered prioritization of camera outputs for processing and alerts. The nearer the boundary, the higher the priority.

FIG. 9A

Figure 9A:
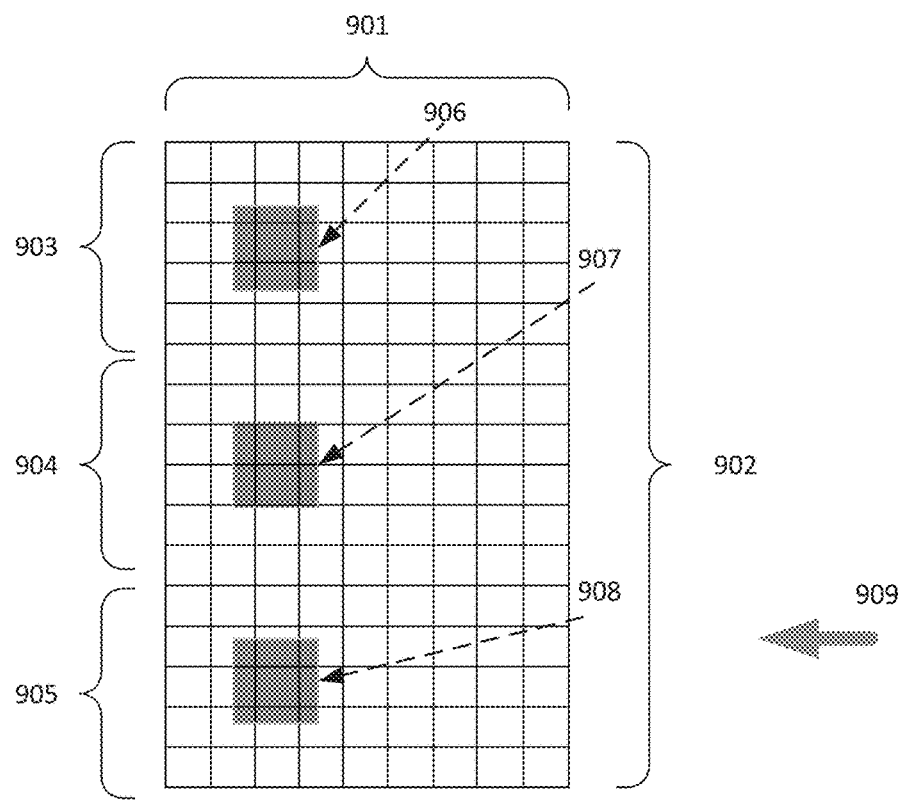
FIG. 9A is a diagram illustrating the apportionment of pixels using a commercial video camera to cover a wide area with multiple GTSs in a sample configuration.

FIG. 9A is a diagram illustrating the apportionment of pixels using a commercial video camera to cover a wide area with multiple GTSs in a sample configuration. The Wide Area Observation System can include coverage over a single or multiple charging stations with each charging station including a GTS with 1 or more GTAs. In FIG. 9A, using the 9-to-16 aspect ratio (e.g., using the 4K, 8K, or 16K standards) provided by a single video camera, the area of interest is defined by an X-axis 901 and a Y-Axis 902 with three charging stations 903, 904, and 905, each with an associated GTS 906, 907, and 908 within the area of interest. In an example configuration, the cameras of the Wide Area Observation System view the area of interest from the direction indicated by arrow 909. While the 4K, 8K and 16K video standard cameras are used in these examples, other digital video cameras standards with differing pixel maps, frame rates, and aspect ratios are contemplated.

FIG. 9B

Figure 9B:
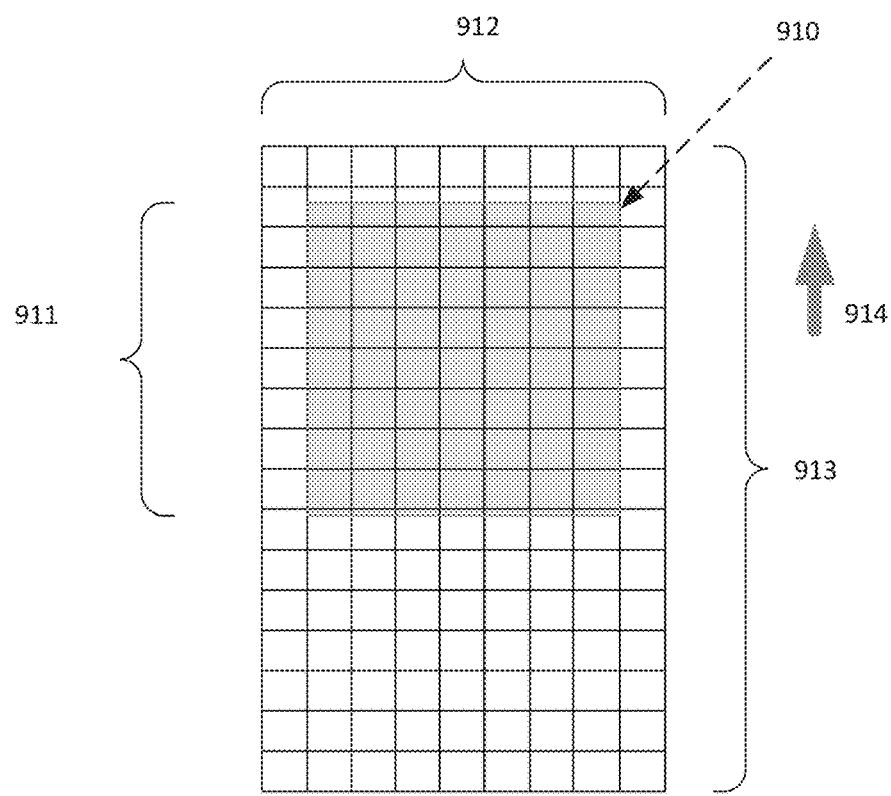
FIG. 9B is a diagram illustrating the apportionment of pixels using a commercial video camera for close-in monitoring of a single GTA in a sample configuration.

FIG. 9B is a diagram illustrating the apportionment of pixels using a commercial video camera for close-in monitoring of a single GTA in a sample configuration. A Close-in Observation system can include coverage over a single or multiple charging stations with a single focus on a single charging station preferred for maximum resolution of object(s) resting on the 1-to-n Ground-Transceiver-Assembly (GTA).

A single fixed, camera view of a charging station is shown in FIG. 9B. The camera coverage area is defined by an X-Axis 912 and a Y-Axis 913. A single GTA 910 comprises the GTS 906, 907, or 908 under observation in this example configuration. The camera coverage area in FIG. 9B is overlaid with a 16:9 grid of cells. Only the pixels that comprise those cells 911 cover the targeted GTS 906, 907, or 908 require scanning for foreign objects, reducing the processing load. The 16:9 aspect ratio in this exemplary figure was selected to show the apportionment of pixels across the target area. In an example configuration, the camera views the camera coverage area from the direction indicated by arrow 914.

In the FIG. 9B system, using the 8K camera standard, the GTS 906, 907, or 908 (consisting of a single GTA), is covered by 49 cells, each cell consisting of 230,400 pixels. Using a 500 millimeter square GTA 910, this means each pixel observes 1.05 square millimeters.

FIG. 10

Figure 10:
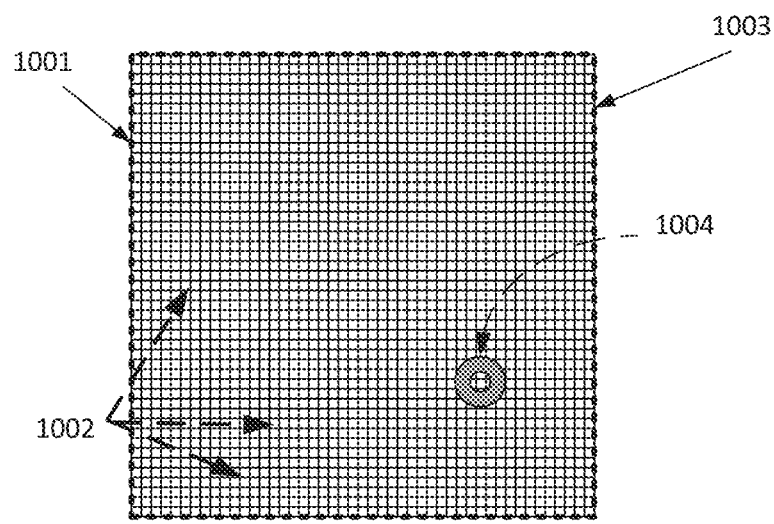
FIG. 10 is a diagram illustrating the optical imaging coverage of a single GTA and a foreign object in a sample configuration.

FIG. 10 is a diagram illustrating the optical imaging coverage of a single GTA and a foreign object in a sample configuration. The GTS 1001 is shown with no vehicle present and with the imaging detection grid 1002 overlaid on the area of interest for the close-in imaging system shown by a perimeter 1003 around the GTS 1001. A foreign object 1004 has been detected by the close in imaging system in the surface of the GTS 1001. If only the close-in imaging system was used for foreign object detection, then the GTS 1001, and thus the charging station, could be disabled before the start of next charging session.

The optical system relies on very small numbers of pixels (down to a single pixel) for foreign object detection. At that granularity, noise can impact the optical system, resulting in false positive detections. There are two types of video noise: shot noise and digital noise. While shot noise is caused by random photons in the photographed scene (background photon flux), digital noise is due to the camera sensor and imaging (photon noise, dark noise, read noise). Although they come from different sources, shot and digital noise are almost indistinguishable.

Use of averaging of pixels from a series of images lowers the impact of such noise. Use of multiple pixel clusters (e.g., 3×3) while lowering the resolution can also reduce the impact of such random single-pixel noise. Since resolution is important, since the GTA coil is not powered during close-in observation (and thus no immediate thermal damage potential), and since the detection of persistent foreign objects is the goal of the close-in observation system, use of multiple subsequent images will be averaged to reduce the impact of noise. At the 120 frames-per-second a subset of images (e.g., the first 30 frames) could be accumulated and averaged with unused frames discarded to lower processing load.

Inspection 103 (FIG. 1) of the GTS 1001 having been identified as having a foreign object 1004 is then performed using impedance testing, with the wide-area observation system enforcing electromagnetic exposure safety, to eliminate a false positive result from the optical system.

FIG. 11

Figure 11:
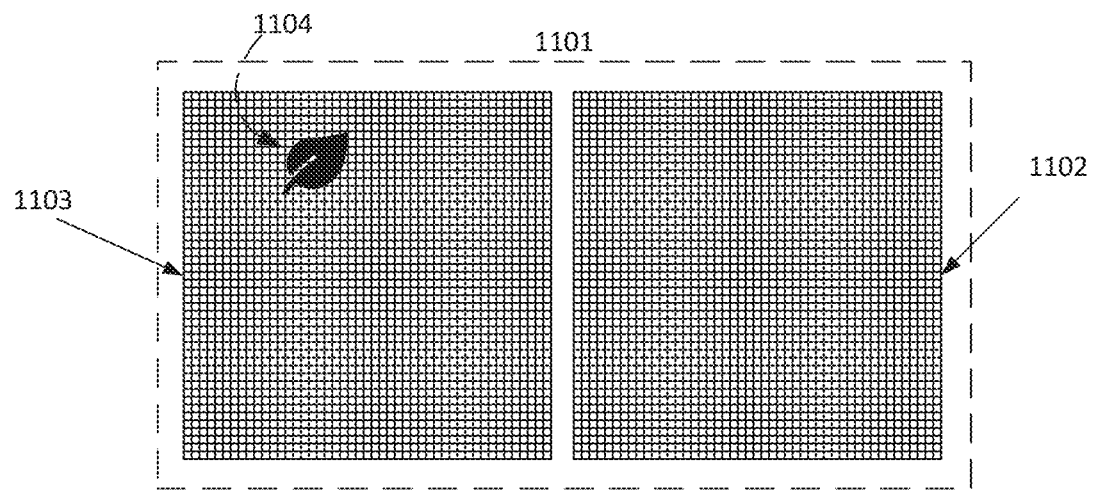
FIG. 11 is a diagram illustrating the optical imaging coverage of a GTS with multiple GTAs and a foreign object in a sample configuration.

FIG. 11 is a diagram illustrating the optical imaging coverage of a GTS with multiple GTAs and a foreign object in a sample configuration. In this example of a multi-GTA GTS, a two pad (a GTS with two GTAs) wireless charging station is shown with no vehicle present. The area under observation 1101 of the close-in imaging system covers both the first GTA 1102 and second GTA 1103. A foreign object 1104 has been detected on the surface of the second GTA 1103 using the close-in imaging system (the object 1104 covers multiple cells of the grid). If only the close-in imaging system was used for foreign object detection, then the second GTA 1103 could be disabled before the start of the next charging session.

With an examination for detection of false positive alarms from the imaging system, confirmation that the object 1104 was one of conductive material with the potential for eddy current heating and thus potentially thermally damaging is possible.

FIG. 12

A good approach to confirming detection of a metallic or conductive foreign object in a WPT system is one in which the detection of the object (or objects) is made prior to coupling to a vehicle, can be made at low power levels, and reuses elements of the existing system for its detection. Thus, it is appealing to use the existing main power coil in the ground transceiver assembly (GTA) as the sensing element. This would make this system a "single-sided" metallic FOD system. In deployments where a GTS consists of multiple GTAs, each coil in the GTA can be used for FOD detection (or confirmation where an optical system made the initial detection). Prior identification of an object on a GTA would trigger Inspection of that particular GTA, limiting power usage and downtime.

Having the foreign object sensing element located in the GTA enables the FOD system to operate in the absence of a vehicle being present. This means that foreign metal objects could be detected in advance of any vehicle approaching, and thus, a GTS could be rendered inoperable prior to any coupling and engagement of the high power-transfer field. Knowing of a FOD issue before the next electric vehicle approaches also allows shunting of the next EV to a compatible, functional charging station (see U.S. patent application Ser. No. 17/646,844; "METHOD AND APPARATUS FOR THE SELECTIVE GUIDANCE OF VEHICLES TO A WIRELESS CHARGER"). Checking for a conductive foreign object immediately after departure also would alert the charging station operator of a customer with poor vehicle maintenance or poor cargo handling.

Since a GTS may charge numerous electric vehicles, it is of economic advantage to have the FOD system deployed on the ground side. Also, the force of gravity lends itself to foreign object detection using the GTS, since a foreign object would normally rest on the planar ground surface provided by the GTA. This would not only ensure operational safety but would also save time that would otherwise be spent as the electric vehicle approaches, aligns, and engages the WPT charger, only to be disabled when a vehicle-based FOD system then detects the conductive foreign object. Also, from a driver (or passenger in an autonomous electric vehicle) perspective, FOD detection is best done automatically before the vehicle charging session initiates so as not to add to the total time associated with a charging session.

The single-sided FOD detection system described here could periodically wake up at some given interval to "scan" the charging coil for any metal objects. Because the intent is not to transfer power, the power level required for FOD is significantly lower (e.g., 1-5 AMPS versus the 50-125 AMPS currently used for high power charging). Thus, scans could be done at any time, without fear of generating any potentially hazardous electromagnetic radiation. Use of the wide-area imaging system would ensure that the immediate area was clear prior to coil energization. The wide-area observation system would also trigger immediate de-energization of the GTA(s) if a person, animal, or vehicle approached the GTS under examination.

In one operational scenario, if the presence of a conducive object is confirmed, an event could be raised to notify the site administration to clear the debris on the pad. The pad would then be disabled until such time as the object is no longer detected (or the system is overridden by the site administration).

Figure 12:
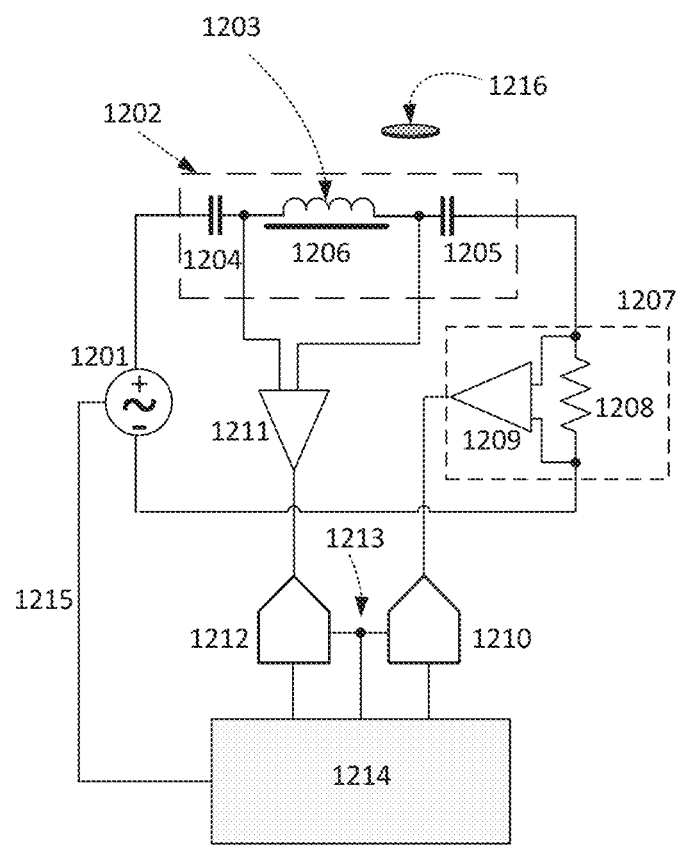
FIG. 12 is a circuit diagram schematically illustrating an exemplary circuit for impedance measurement between WPT charging sessions in a sample configuration.

FIG. 12 is a circuit diagram schematically illustrating an exemplary circuit for impedance measurement between WPT charging sessions in a sample configuration. This circuit reuses portions of the GTA. Operating only in low-power mode, during GTA high power charging operations, the dedicated detection circuitry would be isolated from the charging system. Detection circuit components may also be shielded from the magnetic flux generated during high-power wireless power transfer.

As shown in FIG. 12, a power supply 1201 is used to send alternating current (AC) to the wireless power transmission coil assembly 1202. The assembly 1202 includes the inductive coil 1203, the resonant capacitors 1204 and 1205 and the magnetic redirection plate 1206 (nominally ferrite or other high magnetic permeability material). Since the impedance measurement operation happens when the wireless power transmission coil assembly 1202 is not being used for wireless power transfer, the AC Power supply 1201 can generate test current in the form of a sine wave, a square wave, or a pulse train as needed or desired. Test current levels may also be varied up to ~10% of the nominal power transfer current (e.g., under 10 AMPS for a 100 AMP WPT system).

A current sensor 1207 is used to measure the current passing through the wireless power transmission circuit. As shown in U.S. Patent Application Pub. No. 2021/0293855," CURRENT SENSING IN A WIRELESS POWER TRANSFER SYSTEM," published Sep. 23, 2021, the current sensor 1207 can be implemented as a shunt resistor 1208 with a differential voltage sensor 1209 whose output is digitized by an Analog-to-Digital (A/D) circuit 1210. Alternately to the shunt resistor based current sensor 1207 example shown, the current sensor implementation may be based on indirect means using a Hall-effect sensor, a Rogowski coil, or a Current Transformer (CT) provided sufficient shielding from the inductive transmission coil 1203 can be achieved.

A second voltage sensor 1211 may be used to determine the differential voltage across just the inductive coil 1203 which is digitized by an A/D circuit 1212. The commonly clocked digital signals 1213 from the A/D circuits 1210 and 1212 may be used by the FOD controller 1214 to determine the impedance. The differential voltage sensors 1209 and 1211 also serve to amplify the acquired voltage signals. The FOD controller 1214 also sets the voltage and current delivered by the power supply 1201 during an impedance measurement using the digital datalink 1215.

In sample configurations, the system as described in FIG. 12 detects a conductive foreign object 1216 before a WPT session begins.

FIG. 13

Figure 13:
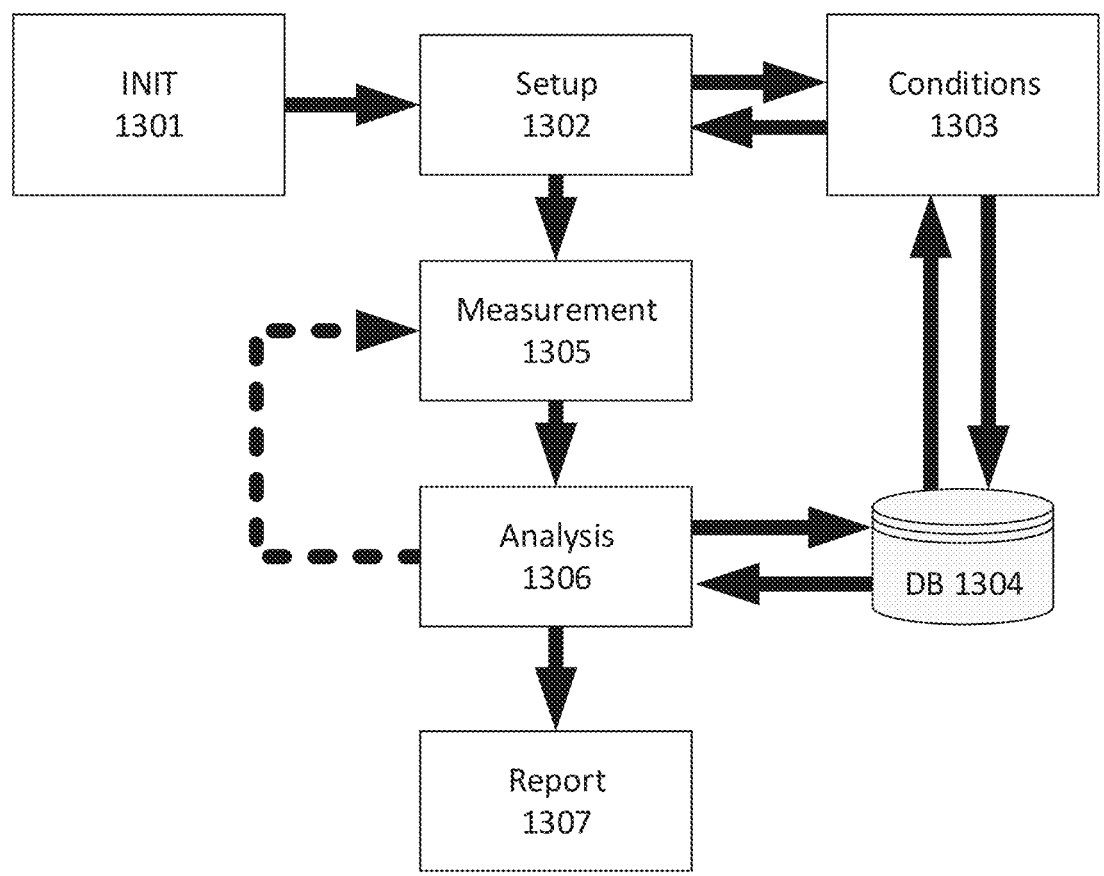
FIG. 13 is a flow diagram illustrating the process for taking and analyzing impedance measurements for the detection of conductive foreign objects in a sample configuration.

FIG. 13 is a flow diagram illustrating the process for taking and analyzing impedance measurements for the detection of conductive foreign objects in a sample configuration. As shown, first an initialization 1301 occurs at some time where a baseline impedance measurement is made. Since it is not guaranteed that this initial measurement is guaranteed to be made with no metal object on the pad, there will be a nominal coil impedance measured at the factory and stored in the processor or an associated memory (e.g., an EEPROM) for the system to use as a starting reference. At installation, when the wireless charging point is first installed, a first test measurement could be made under nominal conditions and the resulting reference impedance and GTA coil temperature stored in the database 1304 at that time. A series of pre-installation impedance measurements taken at differing GTA operating temperatures would provide a reference model for nominal impedance at different temperatures, increasing the overall detection sensitivity versus a single reference impedance.

It will be appreciated by those skilled in the art that the sensing coil's nominal impedance will be affected by ambient temperature. Therefore, an impedance tracking algorithm is included for characterization of impedance versus temperature (temperature being the GTA internal temperature as affected by solar heating, ambient air temperature, and heat not yet dissipated from the last wireless charging session). The impedance tracking algorithm monitors the impedance change from one impedance measurement to the next. If an impedance change is detected, but it is below some threshold, then $Z_{nom}=Z_{new}$. If the impedance change is greater than the threshold, but lower than a second threshold, the nominal impedance is not updated, and an object-detected event is not raised. In this case, $Z_{nom}=Z_{new}$ and no object is detected (e.g., ObjFlag=0). However, if the impedance change exceeds the second threshold, an object is indeed detected. The nominal impedance is not modified, and the object detected event is raised. In this case, $Z_{nom}=Z_{nom}$ (it is not updated) and the object is detected (e.g., ObjFlag=1).

To manage nominal impedance changes that are due to significant changes in ambient temperature (as opposed to a metal object), $Z_{nom}$ can be characterized as a function of temperature. $Z_{nom}$ may be stored in a look up table against which the measured impedance can then be compared, knowing the ambient temperature at the time of the measurement (determined by a temperature sensor 211 in the GTA). Determination as to whether $Z_{nom}$ is updated or not, or if an object is detected, can then follow as described previously.

During Setup 1302, the baseline impedance for the GTA (s) to be examined is loaded into the FOD system. Any conditions or other near real-time sensor readings (e.g., coil temperature, air temperature) 1303 are noted and may be used to adjust the baseline(s) or recover a cached baseline(s) from database 1304. Threshold detection levels may also be uploaded or calculated from the, or in response to, the environmental conditions found.

Once a baseline impedance for each GTA to be examined is determined, an impedance measurement 1305 can be taken. This measurement, using the circuit shown in FIG. 12 or an equivalent, requires that the wireless power transmission coil (e.g., the primary) be powered to a fraction of the nominal wireless power (e.g., 5-50%). This lower power level reduces energy usage, minimizes stress on the GTA electronics, and prevents thermal damage from conductive foreign objects while still providing a detection sensitivity. It is noted that the nominal power applied during an impedance measurement may be dynamic based on the observed size of the object resting on the GTA's surface that is detected by the close-in imaging system.

The inspection of a GTA pad (or pads) is typically under control of the FOD controller 1214. Measurement 1305 may be activated in four ways.

First, the close-in observation system (FIG. 7) would be one of the activation sources. In one example, the activation trigger would be detection of an unoccupied pad under observation of the close-in camera(s) showing a change in the image indicative of the presence of a persistent object on one or more of the GTA pads that comprise the GTS.

Second, the Wide Area Observation System (FIG. 8) would be another source of activation. For an unoccupied charge point (with its installed GTS with one or more GTAs), a proximity alert can be set to be a triggering event. Proximity can be set to a threshold range from the GTS and crossing the threshold triggers an examination. The examination can be postponed until a safety area around the GTS is clear of pedestrians or macro-obstructions (e.g., carts, bicycles, skateboards, etc.).

Third, for an unoccupied charging point, a crossing alert can be set as a triggering event. In this triggering event, a pedestrian or non-charging vehicle crosses over the GTS which triggers an examination for foreign objects. The actual measurement 1305 can be postponed until a safety area around the GTS is clear of pedestrians or macro-obstructions.

Fourth, for an occupied charging point, where a charging electric vehicle is present, the Wide-Area system could trigger a future (when the charge point is unoccupied and the safety area confirmed clear) examination in response to a proximity event (using a set threshold range from the GTS and the observed crossing of the threshold).

The Wide Area Observation System also may be used to detect people, animals or moving objects during measurement 1305. If a preset safety threshold around the GTS is breached, the measurement 1305 stage will abort and be rescheduled for later execution when the prescribed area is clear.

Analysis 1306 of the measured impedance will be compared to the baseline(s) with one baseline for each GTA under examination. The newly measured impedance measurement will be stored in the database 1304 for each measurement.

A variation of a measured impedance from the baseline impedance which exceeds the detection threshold range will result in a report 1307 to the FOD controller 1214. This variation can be in magnitude, phase, or both. After an impingement alert 1307, a measurement 1305 of each GTA of the GTS should be accomplished prior to reactivation of the GTS charging point. A measurement 1305 may be triggered (for immediate action or scheduled action) for other reasons. Other reasons include event triggering by an approaching EV to the GTS or a departing EV from the GTS. Measurement 1305 immediately prior to the arrival of the EV would give both a confirmation of lack of FOD, but also an updated record of the pre-charging session GTA(s) impedance. Measurement 1305 immediately after the charging session and departure of the EV allows for detection of dropped FOD from a known source. The EV driver or owner could then be notified of dropped cargo or debris.

A periodic Measurement 1305 could be triggered on schedule with the Wide Area Observation System providing assurance that the immediate area was clear and warning if the immediate area is approached.

FIG. 14

The charging station for a Wireless Power Transfer system is designed to be unmanned with minimal or no local personnel as attendants or technicians. As such, an automated system to remove detected foreign objects from the surface of GTAs is desired to limit the need to dispatch remote or mobile personnel to clear the GTAs. Robotic sweeper systems currently exist (see, e.g., U.S. Pat. No. 11,278,173, entitled "Autonomous floor-cleaning robot" issued Mar. 22, 2022 for carpet and floor cleaning).

Figure 14:
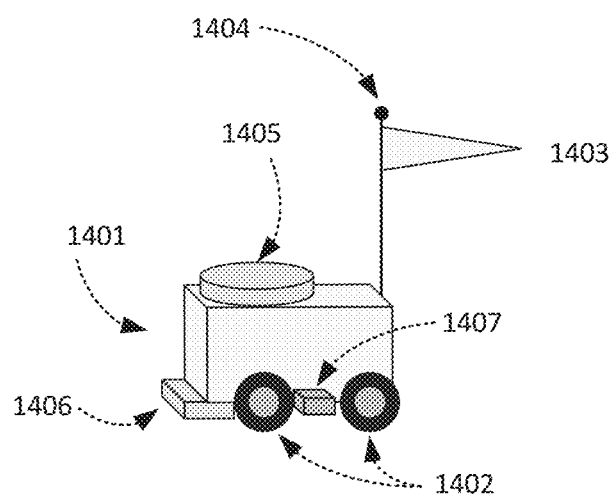
FIG. 14 is a diagram of an exemplary vehicle for the automated removal of foreign objects from the GTAs of a WPT system in a sample configuration.

FIG. 14 is a diagram of an exemplary vehicle for the automated removal of foreign objects from the GTAs of a WPT system in a sample configuration. The clearing robotic vehicle 1401 shown in FIG. 14 uses wheels 1402 for mobility, although tracked versions are foreseen for snowy environs. Since the robotic vehicle 1401 might mix with pedestrians and electric vehicles, visual indicators (a flag 1403 and a flashing light 1404 mounted on the vertical mast) are provided to increase the clearing robot's 1401 detectable presence. The clearing robot 1401 may be guided to the GTA(s) in need of service using the wide-area optical observation system or in combination with the guideline cabling as described in U.S. Pat. No. 10,040,360, entitled "Method and apparatus for the alignment of vehicles prior to wireless charging including a transmission line that leaks a signal for alignment" issued Aug. 7, 2018; U.S. Pat. No. 10,814,729, entitled "Method and apparatus for the alignment of a vehicle and charging coil prior to wireless charging" issued Oct. 27, 2020; and U.S. Pat. No. 11,241,970, entitled "Method and apparatus for the alignment of vehicles prior to wireless charging" issued Feb. 8, 2022. The guideline cabling leads to the GTAs and can be selectively activated to assist the clearing robot in navigation to the correct GTA.

Optional on-board sensors (optical, ultrasonic) 1405 can be used for obstacle avoidance for when the Wide Area Observation System is offline.

The clearing apparatus 1406 may be a fiber broom, a rotating broom, an electromagnet, an anti-Hall effect eddy current generator or a combination of such. Use of a vacuum or suction device in combination with another clearing apparatus is another option.

The clearing robot 1401 may be an electric vehicle using WPT for charging. Use of a VTS for charging allows for recharging both from the WPT GTS charging stations, but also a dedicated GTS in the robot's weather resistant enclosure (not shown).

Communications with the clearing robot 1401 may use a secure wireless local area data network (e.g., IEEE 802.11) or use the inductive communications provided using an inductive communication system equipped Vehicle Transceiver Station (VTS) 1407 mounted to the underside of the chassis of the clearing robot 1401. The VTS and inductive communications system that may be used are described in U.S. Pat. No. 11,121,740, entitled "Near field, full duplex data link for resonant induction wireless charging" issued Sep. 14, 2021.

FIG. 15

Figure 15:
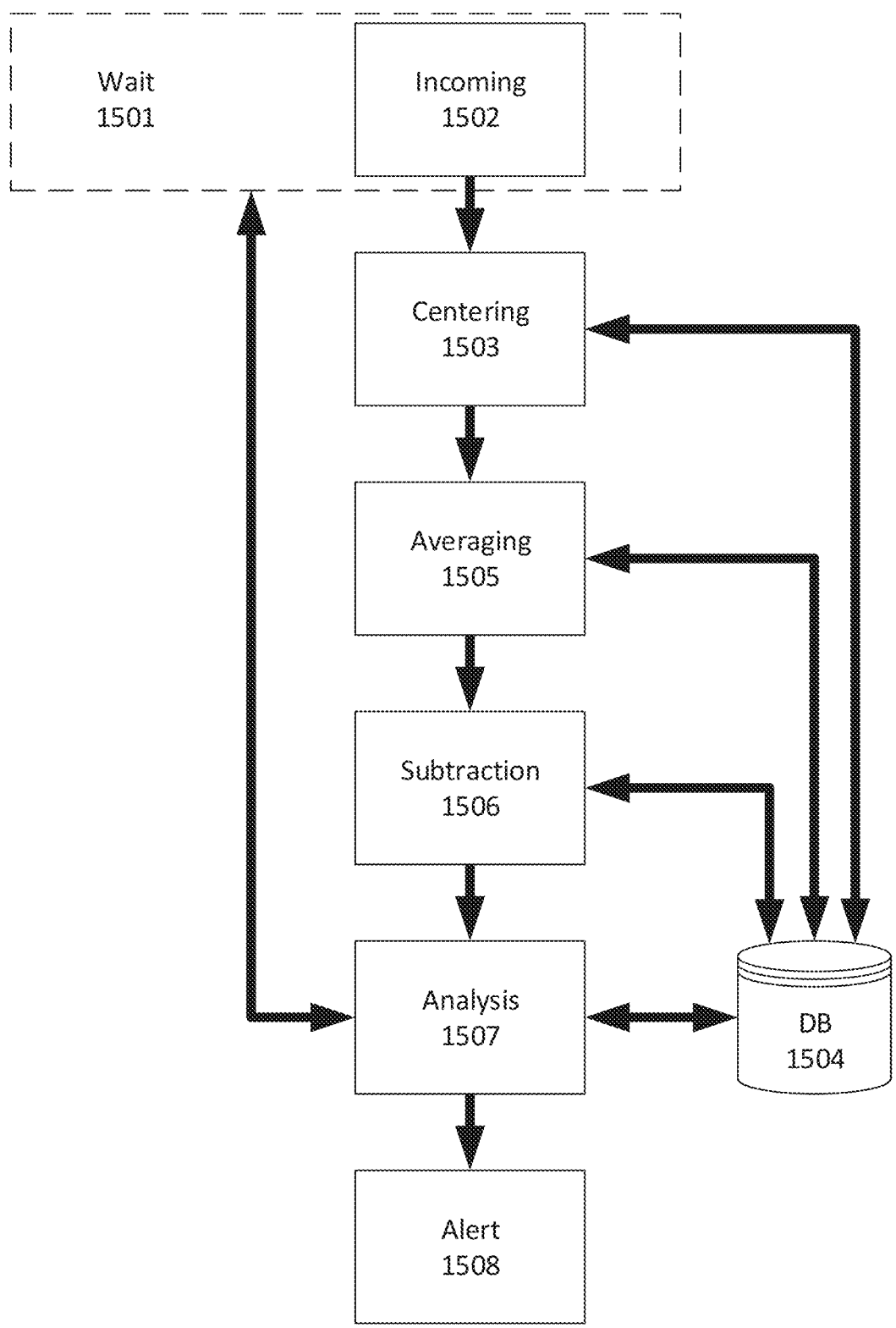
FIG. 15 is a flow diagram that diagrammatically illustrates the process of imaging from the close-in observation system camera(s) in a sample configuration.

FIG. 15 is a flow diagram that diagrammatically illustrates the process of imaging from the close-in observation system camera(s) in a sample configuration.

The close-in observation system implements a procedure including waiting at step 1501 until at least one full image (corresponding to a full image of the target GTA(s)) has arrived. The operation of the close-in camera system may be continuous, periodic/scheduled, or triggered by an outside source (for instance, the FOD controller 1214 can activate the close-in observation system if an EV is arriving for charging). Image processing can be performed using the processor(s) and memory of the FOD controller 1214 or on specialized image processing hardware as is currently available as Graphic Processing Units (GPUs) or Field Programmable Gate Arrays (FPGAs).

An incoming digital image 1502 may be subjected to centering at step 1503. Centering at step 1503 uses algorithms to detect edges and/or corners of the imaged GTAs to detect an off-center camera or a distorted image. Off-center or distorted images may be correctable, be discarded, or cause an alert to the FOD system operator. Information from database 1504 may be used in the centering step 1503 to compare the incoming imagery to prior, known good imagery (i.e., without foreign object(s)).

The Close-in image processing procedure may further rely on the use of an averaging step 1505 to average multiple images of the same GTA to filter out image errors such as speckling. The multiple images are averaged on a pixel (or block of pixels) basis. Since areas outside the GTA are irrelevant to close-in operation, such areas will be filtered out before processing, reducing processing load. Information in database 1504 may be used to determine the areas of interest from the prior identified pixels of interest.

Pixel subtraction at step 1506 may be used to compare the image, now consisting of two or more combined images, with a prior image (also comprised of several averaged images) showing the area of observation without a foreign object.

In the analysis step 1507, the subtracted image pixel map is compared to detection thresholds. Other data (time-of-day, artificial illumination characteristics, ambient light sensing) may be used to set detection thresholds and pick the retained, prior image. Use of the previous foreign object-free image is preferred for the subtraction step 1506, with false positive detections activating the secondary inspection 103 (FIG. 1). This use-last-retained-image with fallback to secondary inspection simplifies image processing issues due to rain and/or snow conditions obscuring the GTA surface from the camera. A successful secondary examination also clears the current image for use in subsequent close-in imaging foreign object detection.

If the analysis step 1507 of the subtracted image pixel map detected a change in the image over a threshold, an alert may be raised at step 1508 and the FOD controller 1214 may suspend charging availability until the secondary inspection has completed.

FIG. 16

Figure 16:
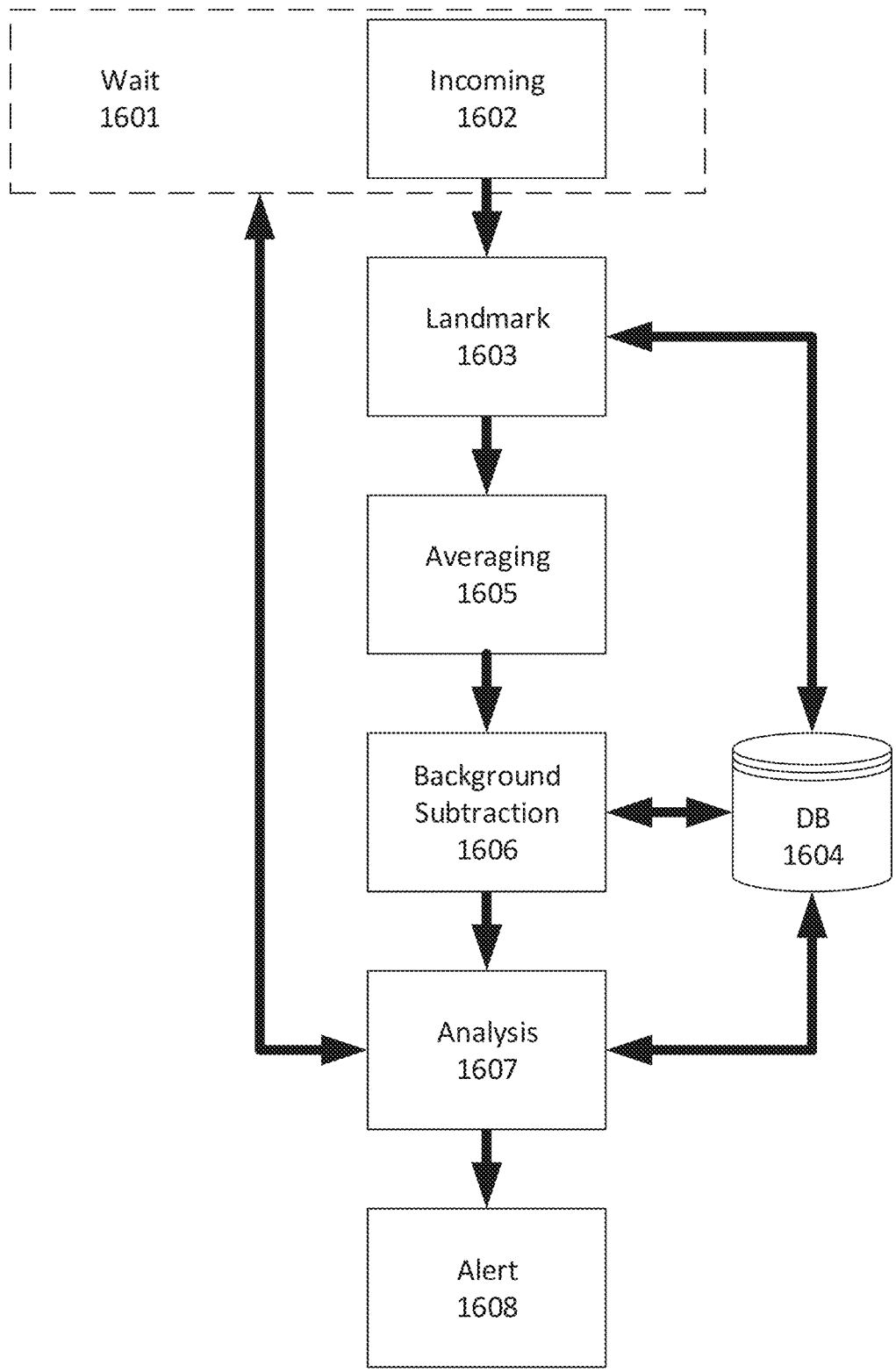
FIG. 16 is a flow diagram that diagrammatically illustrates the process of imaging from the wide-area observation system camera(s) in a sample configuration.

FIG. 16 is a flow diagram that diagrammatically illustrates the process of imaging from the wide-area observation system camera(s) in a sample configuration.

The Wire Area Image Processing procedure of FIG. 16 waits at step 1601 until an image stream becomes available from the Wide Area Observation System. Incoming images 1602 are collected for subsequent processing.

To assure imaging is of the intended area, landmarking is used at step 1603, which nominally includes the comparison of the position, number and spacing of the GTA(s) comprising the GTS(s) under observation in the image versus a reference image. Data is available from calibration or prior retained images from the database 1604. Line, corner, or color subtraction may be used to line up the rectilinear GTA surfaces or find the contrasting coloration of the GTA covers versus the surrounding concrete allowing the images to be overlaid.

Averaging of incoming images at step 1605 is used to eliminate random noise errors.

Background subtraction at step 1606 uses pixel subtraction to eliminate all static sections of the averaged incoming image. The reference background image is pulled from the database 1604. The resultant foreground image may be stored in the database 1604 for future use in the analysis step 1607.

Analysis of the resultant foreground image at step 1607 includes comparison to prior foreground images to determine the current position in the wide-area field of view, direction, and rate of travel of objects in the wide-area area of observation. Other data (borders or perimeters, time-of-day, artificial illumination characteristics, ambient light sensing) can be used to determine the position of the object(s) or its shadow(s) versus the GTSs under observation.

An alert may be sent to the FOD controller 1214 at step 1608 to suspend charging and secondary examination if an object is found to be too close to a GTA, approaching a GTA, or projected to cross a GTA.

Additional image analysis can also be triggered for advanced recognition of images and actions such as human identification and action such as kneeling next to a vehicle while charging, crawling under a vehicle while charging, throwing, or dropping objects, etc. Image analysis may also be used to identify animals (dogs, cats, etc.) approaching a vehicle during charging so that the charging may be suspended until the area is clear.

In an additional configuration, the GTA power applied during impedance measurements, when a vehicle is not present and the GTA is inactive, is kept below a threshold (which varies according to individual coil assembly size, ferrite placement, number of windings) so as to prevent excessive generation of magnetic flux above the regulated amount. The magnetic flux is to be kept below international regulations (e.g., International Commission on Non-Ionizing Radiation Protection (ICNIRP) 2010)) or under 27 µT at the surface of the GTA. The GTA may then be inspected (with a single or multiple impedance measurements) according to a schedule or a set time after a charging session has completed without observation by a camera system albeit at a lower detection threshold. Using this technique, the impedance inspection may detect foreign objects residing on the surface of a GTA, but also may be used to establish or re-establish the impedance baseline for a GTA at various coil temperatures.

Conclusion

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

The functions described herein with respect to FIGS. 1-16 may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to the provision of electrical power to vehicles, it should be understood that this is only one of many possible applications, and other embodiments including non-vehicular applications are possible. Accordingly, all such applications are included within the scope of the following claims.

What is claimed:

1. A method of detecting foreign objects impinging on a ground transceiver assembly (GTA) of a wireless power transfer (WPT) station, comprising:
    observing an area surrounding a charging position of the GTA using at least one camera;
    analyzing images from the at least one camera to identify changes or features indicative of introduction of a foreign object onto an exposed surface of the GTA or in the area surrounding the GTA;
    triggering an impedance inspection of the GTA in response to determining the images are indicative of presence of the foreign object on the exposed surface of the GTA or in the area surrounding the GTA, wherein the impedeance inspection of the GTA comprises sending a test alternating current to a coil assembly of the GTA and measuring an impedance of the GTA; and
    initiating a failsafe operation when presence of the foreign object on the surface of the GTA is confirmed by the impedance inspection.

2. The method of claim 1, wherein observing the area surrounding the charging position of the GTA using the at least one camera is initiated when a vehicle is approaching, present, or scheduled to be present at the charging position.

3. The method of claim 1, wherein observing the area surrounding the charging position of the GTA using the at least one camera comprises monitoring the area surrounding the charging position when the WPT station is not in use for people, animals, or vehicles that could interfere with charging by the WPT station, and when at least one of a person, an animal, or a vehicle is detected, triggering the impedance inspection to be conducted before the WPT station may be used.

4. The method of claim 1, wherein observing the area surrounding the charging position of the GTA using the at least one camera comprises monitoring the area surrounding the charging position when the WPT station is in use for people, animals, or vehicles that could interfere with charging by the WPT station, and when at least one of a person, an animal, or a vehicle is detected, initiating the failsafe operation to at least one of reduce or remove power from the WPT station, signal a driver or occupant of the vehicle, or set visual or audio alarms to alert the at least one person, animal, or vehicle.

5. The method of claim 1, wherein analyzing images from the at least one camera comprises receiving image data based on recent or edited images or representative models of at least one of the charging position or the area surrounding the charging position and comparing the recent or edited images or representative models to images captured while observing the charging position or the areas surrounding the charging position to identify image differences indicative of a foreign object.

6. The method of claim 1, wherein analyzing images from the at least one camera comprises detecting at least one of edges or corners of the GTA and aligning images taken by the at least one camera to at least one of detected edges or corners of the GTA.

7. The method of claim 1, wherein analyzing images from the at least one camera comprises averaging pixels from a series of multiple subsequent images.

8. The method of claim 1, wherein analyzing images from the at least one camera comprises waiting until an image stream from the at least one camera is received, comparing a position, number and spacing of the GTA in an image in the image stream to a reference image, averaging multiple images in the image stream to filter out image errors, performing pixel subtraction to eliminate static sections of the averaged multiple images, comparing a resulting foreground image with a prior foreground image to determine a current position relative to the GTA, and at least one of providing an alert or suspending at least one of charging or impedance inspection when a foreign object is found to be within a preset safety threshold around the GTA, approaching the GTA, or projected to cross the GTA.

9. The method of claim 1, wherein analyzing images from the at least one camera comprises waiting until at least one full image corresponding to a full image of the GTA is received, centering the at least one full image using at least one of detected edges or corners of the full image of the GTA, averaging multiple images of the GTA to filter out image errors, performing pixel subtraction to compare the full image of the GTA with a prior image of the GTA showing the GTA without the foreign object, comparing a result of the pixel subtraction to a detection threshold, and when the result of the pixel subtraction exceeds the detection threshold, at least one providing an alert or suspending availability of the GTA until an impedance inspection may be completed.

10. The method of claim 1, wherein analyzing images from the at least one camera comprises analyzing images from the at least one camera to recognize humans or animals approaching a vehicle during charging at the charging position and suspending the charging when a human or animal is detected in the area surrounding the charging position.

11. The method of claim 1, wherein the impedance inspection of the GTA is triggered when an object is detected on the exposed surface of the GTA longer than a set duration of time.

12. The method of claim 1, wherein the impedance inspection of the GTA comprises powering-up the WPT station at a level below a charging level to measure impedance of the GTA against past impedance readings or models and initiating the failsafe operation upon detection of an increased impedance indicative of a conductive object on or adjacent to the GTA.

13. The method of claim 1, wherein the impedance inspection of the GTA comprises sending the test alternating current to the coil assembly of the GTA in the form of a sine wave, a square wave, or a pulse train at a test current level that powers the coil assembly of the GTA at a fraction of 5-50% of a nominal wireless power applied to the coil assembly of the GTA during charging, measuring a current passing through the coil assembly and a differential voltage across the coil assembly of the GTA, and determining an impedance of the GTA from the measured current and differential voltage.

14. The method of claim 1, wherein the impedance inspection of the GTA further comprises taking at least one baseline impedance measurement of the GTA and storing impedance values for comparison to impedance values during impedance inspection triggered when movement of an object crossing into or over the charging position is detected.

15. The method of claim 14, further comprising tracking impedance changes due to temperature variation or varying environmental conditions, updating baseline impedance measurements of the GTA in a lookup table as a function of the temperature variation or varying environmental conditions, and adjusting impedance measurements of the GTA to reflect the baseline impedance measurements stored in the lookup table based on at least one of a measured temperature or environmental conditions.

16. The method of claim 15, wherein adjusting the baseline impedance measurement of the GTA comprises monitoring impedance from one impedance measurement to the next and, when an impedance change below a first threshold is detected, updating the baseline impedance to a new baseline impedance; when the impedance change is greater than the first threshold but lower than a second threshold, the baseline impedance is not updated and an object detection event is not raised; and when the impedance change exceeds the second threshold, the baseline impedance is also not updated and the object detection event is raised.

17. The method of claim 1, wherein the impedance inspection of the GTA is triggered when the charging position is unoccupied and quiescent for charging.

18. The method of claim 1, wherein the impedance inspection of the GTA is triggered when the GTA is unoccupied and analysis of the images from the at least one camera show at least one of a change indicative of presence of a persistent object on the GTA, an object crossing a threshold a predetermined distance from the GTA, or a pedestrian or non-charging vehicle crossing over the GTA.

19. The method of claim 1, wherein the impedance inspection of the GTA is triggered when the GTA is occupied by a vehicle for charging and analysis of the images from the at least one camera show a person, an animal, or an object breaching a preset safety threshold around the GTA.

20. The method of claim 1, wherein the impedance inspection of the GTA is triggered upon detection of an approaching electric vehicle for charging by the WPT station at the charging position or upon detection of an electric vehicle departing from the charging position.

21. The method of claim 1, wherein initiating the failsafe operation comprises taking the GTA out of service while the charging position is unoccupied by a vehicle for charging.

22. The method of claim 1, wherein when the charging position is occupied by a vehicle for charging, the failsafe operation is initiated when movement of the foreign object crossing into or over the charging position is detected.

23. The method of claim 1, further comprising at least one of issuing an alert or initiating the failsafe operation when an object is detected to be moving toward the charging position during the impedance inspection or during charging of the vehicle.

24. The method of claim 1, further comprising initiating the failsafe operation when the impedance inspection of the GTA produces a variation of a measured impedance from a measured baseline impedance that exceeds a detection threshold range in at least one of magnitude or phase.

25. The method of claim 1, further comprising deploying a first camera for close-in observation of the charging position and deploying a second camera for wide-area observation of the area surrounding the charging position.

26. The method of claim 1, further comprising deploying a series of cameras each with coverage over one or more GTAs from elevated positions and setting multiple boundaries for each camera to present a layered prioritization of camera outputs for processing and alerts.

27. The method of claim 1, wherein when a foreign object is detected on the exposed surface of the GTA or in the area surrounding the charging position, dispatching a robotic cleaning device or mobile personnel to remove the detected foreign object from the exposed surface of GTA.

28. A system for detecting foreign objects impinging on a ground transceiver assembly (GTA) of a wireless power transfer (WPT) station, comprising:
- at least one camera positioned to observe an area surrounding a charging position of the GTA;
- an impedance measurement circuit that measures an impedance of a wireless power transfer coil of the GTA;
- an imaging processor that analyzes images from the at least one camera to identify changes or features indicative of introduction of a foreign object onto an exposed surface of the GTA or in the area surrounding the GTA; and
- a foreign object detection (FOD) controller that triggers an impedance inspection of the GTA by the impedance measurement circuit in response to determining the images are indicative of presence of the foreign object on the exposed surface of the GTA or in the area surrounding the GTA, wherein the impedance inspection of the GTA comprises sending a test alternating current to the wireless power transfer coil of the GTA and measuring the impedance of the wireless power transfer coil, and that initiates a failsafe operation when presence of the foreign object on the surface of the GTA is confirmed by the impedance inspection.

29. The system of claim 28, wherein the at least one camera comprises a first camera positioned for close-in observation of the charging position and a second camera positioned for wide-area observation of the area surrounding the charging position.

30. The system of claim 29, wherein detection of a foreign object by the first camera or detection of a human or animal in the area surrounding the charging position by the second camera triggers an impedance measurement by the impedance measuring circuit.

31. The system of claim 28, wherein the at least one camera comprises a series of cameras each with coverage over one or more GTAs from elevated positions, and wherein multiple boundaries are set for each camera to present a layered prioritization of camera outputs for processing and alerts.

32. The system of claim 28, wherein the FOD controller enables and sets detection thresholds and perimeters around the GTA, schedules image processing by the image processor, and sends alerts and alarms to local and remote networked entities for controlling operation of the WPT station.

33. The system of claim 32, wherein the networked entities include a station controller that manages charging schedules, power distribution, and at least one of wired or wireless communications associated with the WPT station.

34. The system of claim 33, further comprising a reservation system, wherein the station controller performs at least one of disabling the GTA in response to an alert from the FOD controller, resetting local directional signals to the GTA, informing the reservation system that the GTA is off-line when a foreign object detection on the GTA is confirmed, and calling for local maintenance or remote maintenance of the GTA.

35. The system of claim 28, wherein the FOD controller includes a processor that is programed to collect local data and remote data, settings, and software and to use collected data to verify communications links and apply security settings to the WPT station.

36. The system of claim 35, wherein the FOD controller further queries the at least one camera, the imaging processor, and each GTA of the WPT station to collect data captured while observing the area surrounding the charging position.

37. The system of claim 28, further comprising a robotic cleaning device that is dispatched when a foreign object is detected on the exposed surface of the GTA or in the area surrounding the charging position to remove the detected foreign object from the exposed surface of GTA.

38. The system of claim 37, wherein the robotic cleaning device is guided to the GTA wirelessly or using guideline cabling.

39. The system of claim 37, wherein the robotic cleaning device comprises at least one of a fiber broom, a rotating broom, an electromagnet, an anti-Hall effect eddy current generator, a vacuum, or a suction device adapted to remove the foreign object.

40. The system of claim 37, wherein the robotic cleaning device comprises an electric vehicle that is charged by the WPT station.

41. The system of claim 37, wherein the robotic cleaning device uses at least one of a secure wireless local area data network or an inductive communications network to communicate with the WPT station.

* * * * *